US011933475B1

(12) United States Patent
Turner

(10) Patent No.: US 11,933,475 B1
(45) Date of Patent: Mar. 19, 2024

(54) DUAL ZONE LIGHTING SYSTEM

(71) Applicant: Robert William Turner, Springdale, AR (US)

(72) Inventor: Robert William Turner, Springdale, AR (US)

( * ) Notice: Subject to any disclaimer, the term of this patent is extended or adjusted under 35 U.S.C. 154(b) by 0 days.

(21) Appl. No.: 17/493,583

(22) Filed: Oct. 4, 2021

(51) Int. Cl.

| | |
|---|---|
| ***F21S 8/02*** | (2006.01) |
| ***F21V 17/18*** | (2006.01) |
| ***F21V 21/04*** | (2006.01) |
| ***F21V 29/50*** | (2015.01) |
| ***F21V 29/83*** | (2015.01) |

(52) U.S. Cl.
CPC .............. *F21S 8/026* (2013.01); *F21V 17/18* (2013.01); *F21V 21/049* (2013.01); *F21V 29/50* (2015.01); *F21S 8/02* (2013.01); *F21V 21/04* (2013.01); *F21V 21/041* (2013.01); *F21V 21/042* (2013.01); *F21V 21/043* (2013.01); *F21V 21/044* (2013.01); *F21V 21/045* (2013.01); *F21V 21/046* (2013.01); *F21V 21/047* (2013.01); *F21V 21/048* (2013.01); *F21V 29/83* (2015.01)

(58) Field of Classification Search
CPC ...... F21V 21/04; F21V 21/041; F21V 21/042; F21V 21/043; F21V 21/044; F21V 21/045; F21V 21/046; F21V 21/047; F21V 21/048; F21V 21/049; F21V 29/83; F21S 8/02; F21S 8/026
See application file for complete search history.

(56) References Cited

U.S. PATENT DOCUMENTS

| | | | | |
|---|---|---|---|---|
| 3,116,023 A | | 12/1963 | Van Dusen, Jr. et al. | |
| 3,666,040 A | | 5/1972 | Junk | |
| 4,794,502 A | | 12/1988 | Guggemos | |
| 5,068,772 A | | 11/1991 | Shapiro et al. | |
| D331,638 S | | 12/1992 | Vamberszky et al. | |
| 5,264,994 A | | 11/1993 | Choi | |
| 5,465,199 A | * | 11/1995 | Bray | F21V 17/164 362/147 |
| D370,550 S | | 6/1996 | Lecluze | |

(Continued)

FOREIGN PATENT DOCUMENTS

| | | | | |
|---|---|---|---|---|
| CN | 104763951 A | * | 7/2015 | |
| GB | 2581185 A | * | 8/2020 | F21V 19/003 |

OTHER PUBLICATIONS

Machine translation of CN 104763951 A retrieved from the FIT database of PE2E search. (Year: 2023).*

*Primary Examiner* — Colin J Cattanach
(74) *Attorney, Agent, or Firm* — Schrantz Law Firm, PLLC; Stephen D. Schrantz

(57) ABSTRACT

The housing provides recessed lighting with a detachable trim. The housing provides an attachment base for securing the trim adapter and trim. The housing provides a sealed housing that limits the number of bugs, pests, and animals from entering the structure or building a nest within the lighting. The housing provides a removable top cover that secures onto the housing. The top cover can be removed to expose vents within the housing. The top cover installs onto the housing to close the vents. The housing also provides an opening for securing a junction box to the housing for installing the wiring needed for the light. The junction box may be installed onto the housing or may be removed from the housing depending on the installation.

17 Claims, 19 Drawing Sheets

(56) References Cited

U.S. PATENT DOCUMENTS

| | | | |
|---|---|---|---|
| 5,567,041 A | 10/1996 | Slocum | |
| 5,609,414 A | 3/1997 | Caluori | |
| D381,454 S | 7/1997 | Lecluze | |
| D397,472 S | 8/1998 | Lecluze | |
| D400,292 S | 10/1998 | Hoffbauer | |
| 5,826,970 A | 10/1998 | Keller et al. | |
| 6,286,980 B1 | 9/2001 | Meyer | |
| D449,898 S | 10/2001 | Horowitz | |
| D472,996 S | 4/2003 | Horowitz | |
| D473,965 S | 4/2003 | Lecluze | |
| 6,588,922 B1 | 7/2003 | DeCicco | |
| D488,251 S | 4/2004 | Benghozi | |
| 6,799,869 B1 | 10/2004 | Beadle | |
| 7,093,953 B1 | 8/2006 | Dicke et al. | |
| 7,117,641 B2 | 10/2006 | Lee | |
| 7,234,846 B2 | 6/2007 | Chen | |
| D546,999 S | 7/2007 | Rashidi | |
| D562,490 S | 2/2008 | Rashidi | |
| 7,331,555 B2 | 2/2008 | St. Pierre | |
| D578,678 S | 10/2008 | Huang | |
| 7,500,766 B1 | 3/2009 | Reynolds | |
| D601,293 S | 9/2009 | MacKenzie | |
| D601,295 S | 9/2009 | Brown | |
| D606,696 S | 12/2009 | Chen et al. | |
| 7,625,105 B1 * | 12/2009 | Johnson | F21S 8/02 362/147 |
| D610,291 S | 2/2010 | Yoshinobu et al. | |
| D610,292 S | 2/2010 | Yoshinobu et al. | |
| D615,239 S | 5/2010 | Rashidi | |
| D636,921 S | 4/2011 | Van de Ven et al. | |
| D644,781 S | 9/2011 | Kawagoe et al. | |
| D670,855 S | 11/2012 | Turner | |
| 8,408,759 B1 * | 4/2013 | Rashidi | F21V 17/002 362/240 |
| D707,877 S | 6/2014 | Turner | |
| 2003/0186017 A1 | 10/2003 | Stockton | |
| 2004/0240211 A1 | 12/2004 | Rodgers et al. | |
| 2007/0076441 A1 * | 4/2007 | Zampini, II | F21V 3/00 362/655 |
| 2007/0183154 A1 | 8/2007 | Robson | |
| 2009/0135608 A1 | 5/2009 | Sell | |
| 2010/0165643 A1 * | 7/2010 | Russo | F21V 21/04 362/365 |
| 2011/0103068 A1 * | 5/2011 | Park | F21V 15/01 362/365 |
| 2011/0193498 A1 * | 8/2011 | O'Boyle | F21V 25/00 315/362 |
| 2016/0033123 A1 * | 2/2016 | Wronski | F16J 15/027 277/645 |
| 2016/0238226 A1 * | 8/2016 | Rashidi Doust | F21V 21/047 |
| 2019/0301710 A1 * | 10/2019 | Harris | F21S 8/026 |

* cited by examiner

DUAL ZONE LIGHTING SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates generally to recessed lighting fixtures that serve multiple functions. The present invention provides a sealed housing that limits pests by attaching a top cover. The present invention also provides a vented housing that vents into the attic, a building, home, or other structure by removing the top cover. The present invention relates more particularly to limiting the number of insects, pests, birds, and other unwanted animals from nesting within the lighting fixture and entering the building, residence, and/or structure. The present invention also enables venting the area above the recessed lighting fixture, such as an attic, through vents, such as apertures or openings in the upper surface of the housing.

II. Description of the Known Art

Recessed lighting fixtures are lighting fixtures which may be installed in an appropriately sized hole in a wall or ceiling. The recessed lighting fixture is substantially flush with the exposed surface of the wall or ceiling.

Patents and patent applications disclosing relevant information are disclosed below. These patents and patent applications are hereby expressly incorporated by reference in their entirety.

U.S. Pat. No. 5,068,772 issued to Shapiro on Nov. 26, 1991 ("the '772 patent") teaches a recessed lighting fixture including a housing having spaced apart generally vertical walls defining an interior and an open bottom end. The walls taught by the '772 patent have generally vertical slots through them. The fixture taught by the '772 patent has lip means for maintaining the bottom end of the housing against a lower surface of a ceiling. The fixture taught by the '772 patent further includes a plurality of mounting members disposed on an exterior surface of the wall means. Each of these mounting members taught by the '772 patent has a first end, an outwardly curved elongated body portion made of resilient material and a second end. The first end of each mounting member taught by the '772 patent is attached to the housing near the bottom end of the housing. The second end of the mounting member taught by the '772 patent extends at least partially through the slot into the interior of the fixture so that at least a portion of the second end is accessible from the interior through the open bottom end. The second end taught by the '772 patent is slidable within the slot so that, when the lighting fixture is inserted into the hole in the ceiling, sliding the second end to a lower position along the slot increases the degree of curvature of the curved elongated body portion above an upper surface of the ceiling to urge the elongated body portions against the ceiling to secure the fixture. The fixture taught by the '772 patent further includes means for selectively locking the second end at the lower position along the slot.

U.S. Pat. No. 5,264,994 issued to Choi on Nov. 23, 1993 ("the '994 patent") teaches a recessed illuminating apparatus that has a fluorescent lamp horizontally arranged in a cylindrical body, a first reflecting plate having a wave shape is mounted on the body, and a second reflecting plate is mounted by a plurality of supporting members in an open portion at the lower portion of the body, whereby the reflecting efficiency is effectively increased. A plurality of sliding holes taught by the '994 patent are formed in the side wall of the body, and a respective fastening member is inserted into each sliding hole and secures the body when the body is inserted into a recessed hole in a ceiling.

U.S. Pat. No. 5,567,041 issued to Slocum on Oct. 22, 1996 ("the '041 patent") teaches a self supporting recessed ceiling fixture including a can formed of an exterior cylinder with four spring clips attached thereto and an interior cylinder. The exterior cylinder taught by the '041 patent has an interior surface, an exterior surface and a bottom edge with a bottom opening adjacent thereto. Each spring clips taught by the '041 patent are capable of movement between the interior and exterior surface of the exterior cylinder. The exterior cylinder taught by the '041 patent is positioned within a hole of a ceiling. The spring clips taught by the '041 patent support the exterior cylinder within the hole of the ceiling. The interior cylinder taught by the '041 patent is positioned within the exterior cylinder in the ceiling and supported by three supporting spokes. Included is a bulb support formed of four sections taught by the '041 patent. The bulb support taught by the '041 patent is positioned within the interior cylinder. A diffusing lens taught by the '041 patent is provided. Lastly, a support ring for positioning within the exterior cylinder taught by the '041 patent is included. The support ring taught by the '041 patent supports the lens within the can positioned through the ceiling.

U.S. Pat. No. 7,234,846 issued to Chen on Jun. 26, 2007 ("the '846 patent") teaches an embedded lamp comprises a base, an embedded bracket, a lamp socket, and a decorative plate, wherein a flange is formed on the internal periphery of a rotatable bracket of the embedded bracket for coupling with the decorative plate. A protrudent ring taught by the '846 patent having at least a pair of buckling means having a pair of protrudent elastic buckles is mounted on the internal periphery of the decorative plate. When the decorative plate is inserted into the rotatable bracket, the protrudent elastic buckles taught by the '846 patent are bounded to buckle the flange and to be positioned thereon. By means of the above-mentioned structure, the decorative plates taught by the '846 patent with different internal diameter dimensions can be replaced with one another according to the diameter dimensions of various light bulbs without detaching the base and the embedded bracket. Accordingly, the ’846 patent teaches that it facilitates the replacement of the light bulbs without need of high maintenance technique.

U.S. Pat. No. 7,500,766 issued to Reynolds on Mar. 10, 2009 (“the ’766 patent”) teaches a tinted glass lens that is attached to an existing light baffle and a new frame to form a removable assembly. The assembly taught by the ’766 patent is installed in an existing ceiling recessed lighting fixture having a compact fluorescent bulb to cut glare and cover the bulb. The assembly taught by the ’766 patent removably attaches with tensioning spring hooks contacting an existing can. The tinted lens taught by the ’766 patent has a bottom reflective coating to match ceiling and can be interchanged with lenses of other tints to create desired lighting effects.

These shortcomings are overcome by the invention disclosed herein. Accordingly, it would be desirable to provide an improved device and system for a recessed lighting system.

SUMMARY OF THE INVENTION

The present invention provides a housing for recessed lighting. The housing provides an attachment base for securing the trim adapter and trim. The housing provides a sealed housing that limits the number of bugs, pests, and animals from entering the structure through the lighting and from building a nest within the lighting.

The housing provides a top cover, such as a removable lid, that secures onto the housing. The top cover can be removed to expose vents within the housing. The top cover installs onto the housing to close the vents. Removing the top cover allows venting of the space above the housing. In one embodiment, the vents allow venting of an attic or other area within a house, building, or other structure.

The housing also provides an opening for securing a junction box to the housing for installing the wiring needed for the light. The junction box may be installed onto the housing or may be removed from the housing depending on the installation.

It is an object of the present invention to limit bugs, pests, birds, and other animals from nesting within recessed lighting.

It is also an object of the present invention to limit bugs, pests, birds, and other animals from entering a house, residence, building, or other structure through the lighting.

It is also an object of the present invention to provide a removable top cover that exposes apertures for venting through the recessed lighting when the top cover is removed.

It is also an object of the present invention to provide a self-enclosed recessed lighting with a removable top cover.

It is also an object of the present invention to simplify the process of attaching the trim around recessed lighting.

These and other objects and advantages of the present invention, along with features of novelty appurtenant thereto, will appear or become apparent in the course of the following descriptive sections and the attached drawings.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
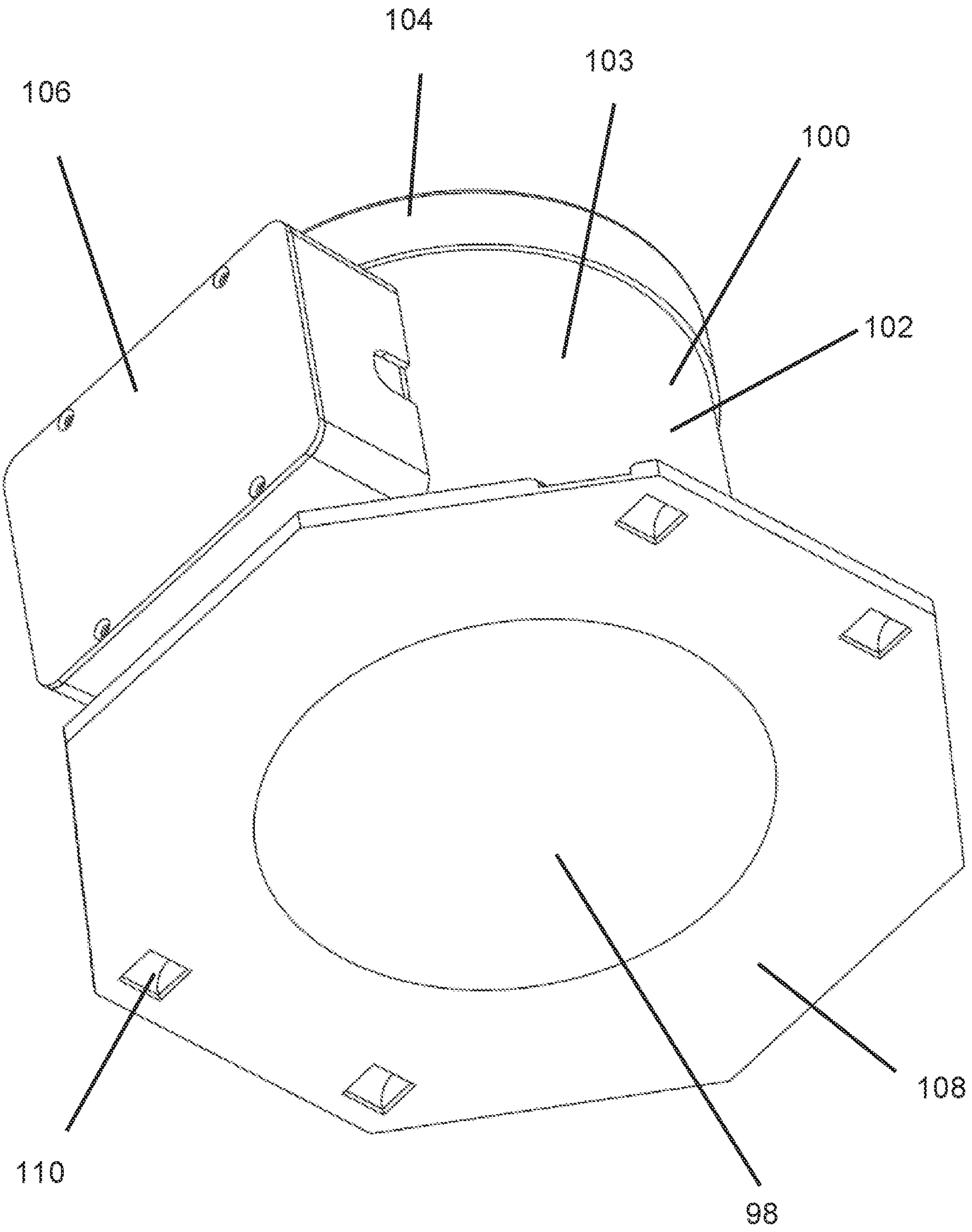
FIG. 1 is a bottom perspective view of a portion of one embodiment of the present invention.
Figure 2:
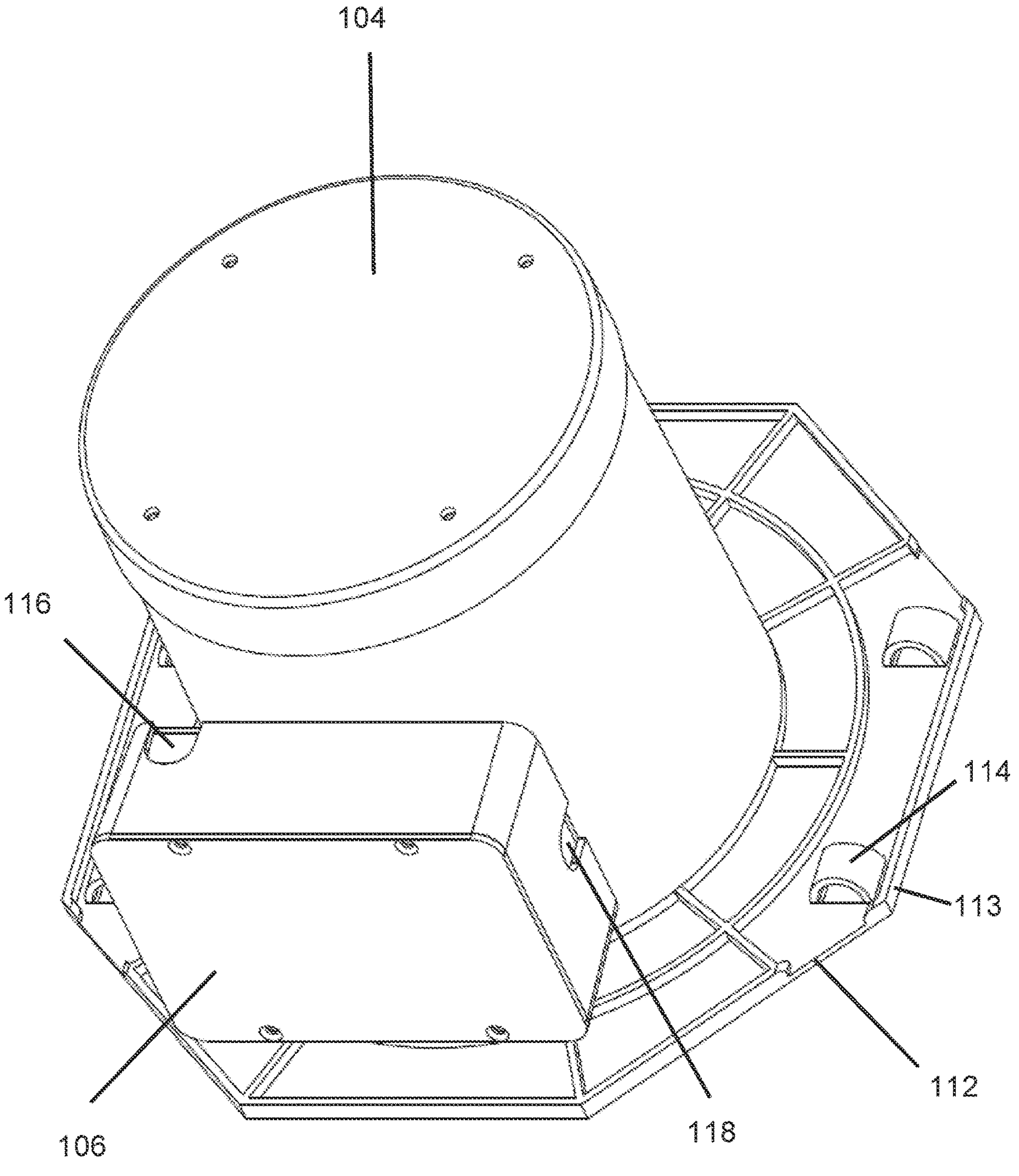
FIG. 2 is a top perspective view thereof.

FIGS. 1 and 2 show the lighting system 100 for recessed lighting, such as can lighting. The lighting system 100 provides a housing 102 in which the light is placed. The housing 102 provides a fully contained lighting system that accepts the light, vents the housing 102, and attaches to a removable top cover 104.

The removable top cover 104 enables the lighting system to serve as a multi-function fixture. The top cover 104 attaches to the housing 102 to restrict access through the housing 102. The removable top cover attaches to limit the number of insects entering a building, house, or structure through the lighting system 100. In the alternative, the top cover 104 removed from the housing 102 vents the building, house, or structure through the housing. Removing the top cover 104 from the housing 102 vents the building, house, or structure by allowing air to flow through vents within the housing 102.

Box 106 secures to the side of the housing 102. The box 106 stores the wiring for powering the light within the housing 102. Box 106 provides access apertures 116, 118 in which the wiring inserts into the box 106.

The housing 102 provides a base 108 for securing the trim. The base 108 provides opening 98 in which the light is installed. The trim installs onto the base 108 while allowing access into opening 98. The trim installs at the ceiling as a visible portion to a person below the light while the housing is positioned above the ceiling.

Aperture 110 provides an opening for running conductors, such as wire or insulated wires to the light within housing 102. Attachment arms 114 secure the conductors to the base

108 and the housing 102. The wires are inserted under the attachment arms 114 through mouth 112. Mouth 112 provides an opening for the conductor to be placed adjacent the base 108. The conductors insert into apertures 116, 118 into the box 106 and housing 102.

FIGS. 1-4 show the neck 103 of the housing 102. The neck 103 extends vertically upward from the base 108. The neck 103 defines an outer portion of the opening 98. The neck 103 of one embodiment extends radially outward from the opening 98 to form a cylindrical shape. The neck 103 also provides an opening for the wiring of the box 106 to pass into the housing 102. The wiring in box 106 powers the light within the housing as box 106 contains the wiring similar to a junction box.

The neck 103 extends upward to the upper surface 120 of the housing 102. In one embodiment, vents are positioned through the upper surface 120 of the housing 102. The vents extend through the upper surface 120 of the housing into the opening 98. Top cover 104 opens and closes the vents through the upper surface 120 by covering the vents when attached and exposes the vents when removed.

Top cover 104 attaches to the housing 102 to cover the upper surface of the housing 102. The top cover 104 provides a removable top/lid that attaches and detaches from the housing 102. Detaching the removable top cover 104 from the housing provides access to vents in the upper surface of the housing 102. Removing the top cover 104 opens the vents to allow ventilation of the housing 102. Securing the top cover 104 to the housing closes the vents of the upper surface.

Figure 4:
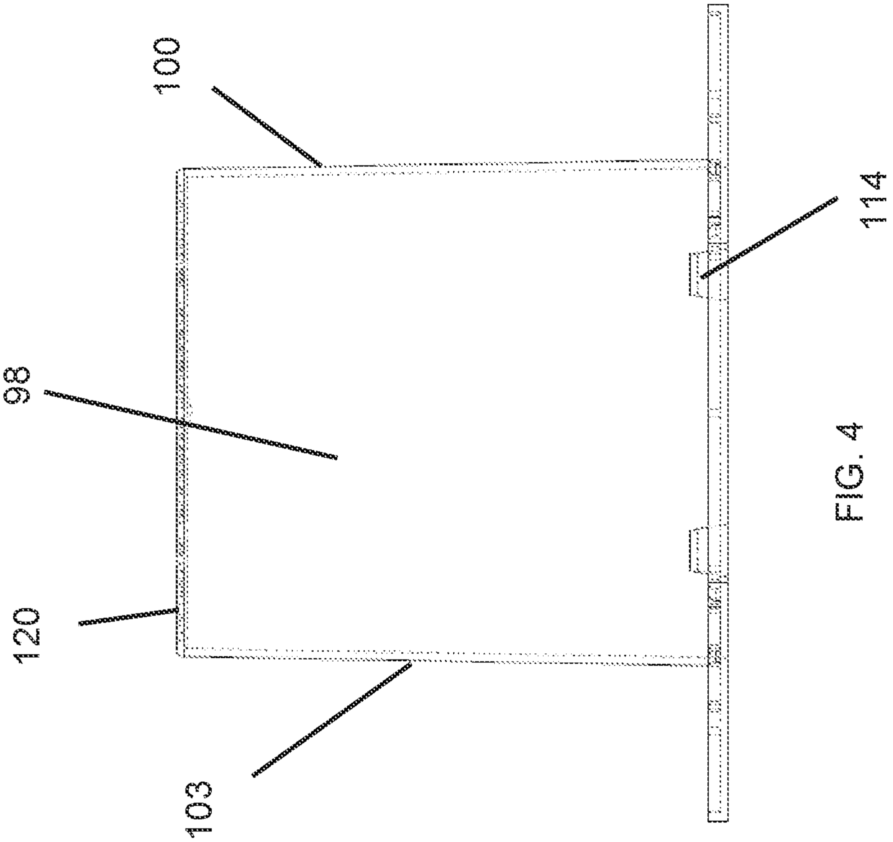
FIG. 4 is a right side sectional view thereof.
Figure 3:
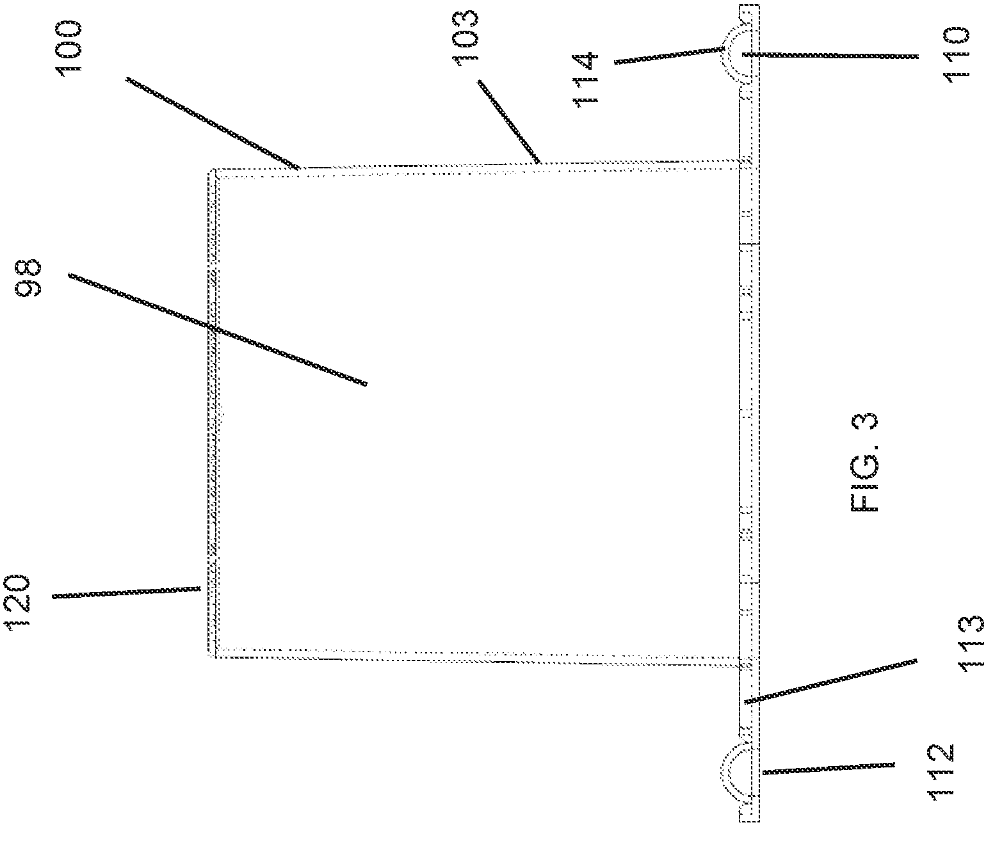
FIG. 3 is a front sectional view thereof.

FIGS. 3 and 4 show a side view of the system 100. The attachment arms 114 provide opening 110 for securing the conductors to the housing 102. Mouth 112 provides an opening that enables insertion of the conductor through the attachment arms 114. Lip 113 extends vertically above the base. The lip 113 of one embodiment extends upward from an outer edge of the base 108. The mouth 112 creates an opening in the lip at the attachment arms 114 and apertures 110. The opening in the lip 113 at mouth 112 allows for simpler running of the wiring to the housing 102. The wiring can pass under the attachment arms 114 without traveling upwards due to lip 113.

Figure 5:
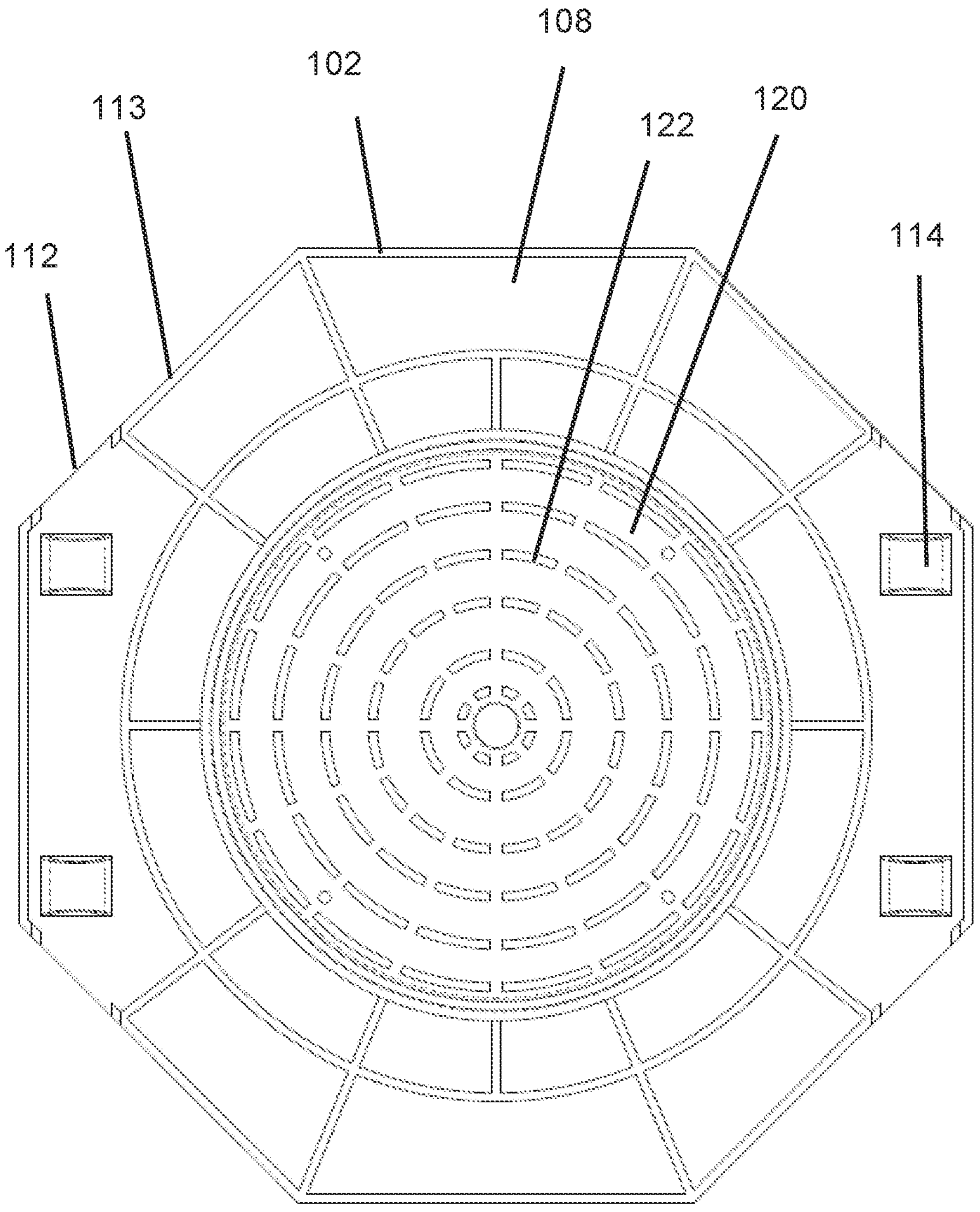
FIG. 5 is a top view of a housing of one embodiment of the present invention.

FIG. 5 shows a top view of the housing 102 showing the lips 113 and attachment arms 114 at the base 108 as discussed above. The upper surface 120, such as top, of the housing 102 provides vents 122. Such vents 122 allow circulation through the housing 102. The top cover removes from the housing 102 to expose the vents allowing air flow through vents 122.

Figure 6:
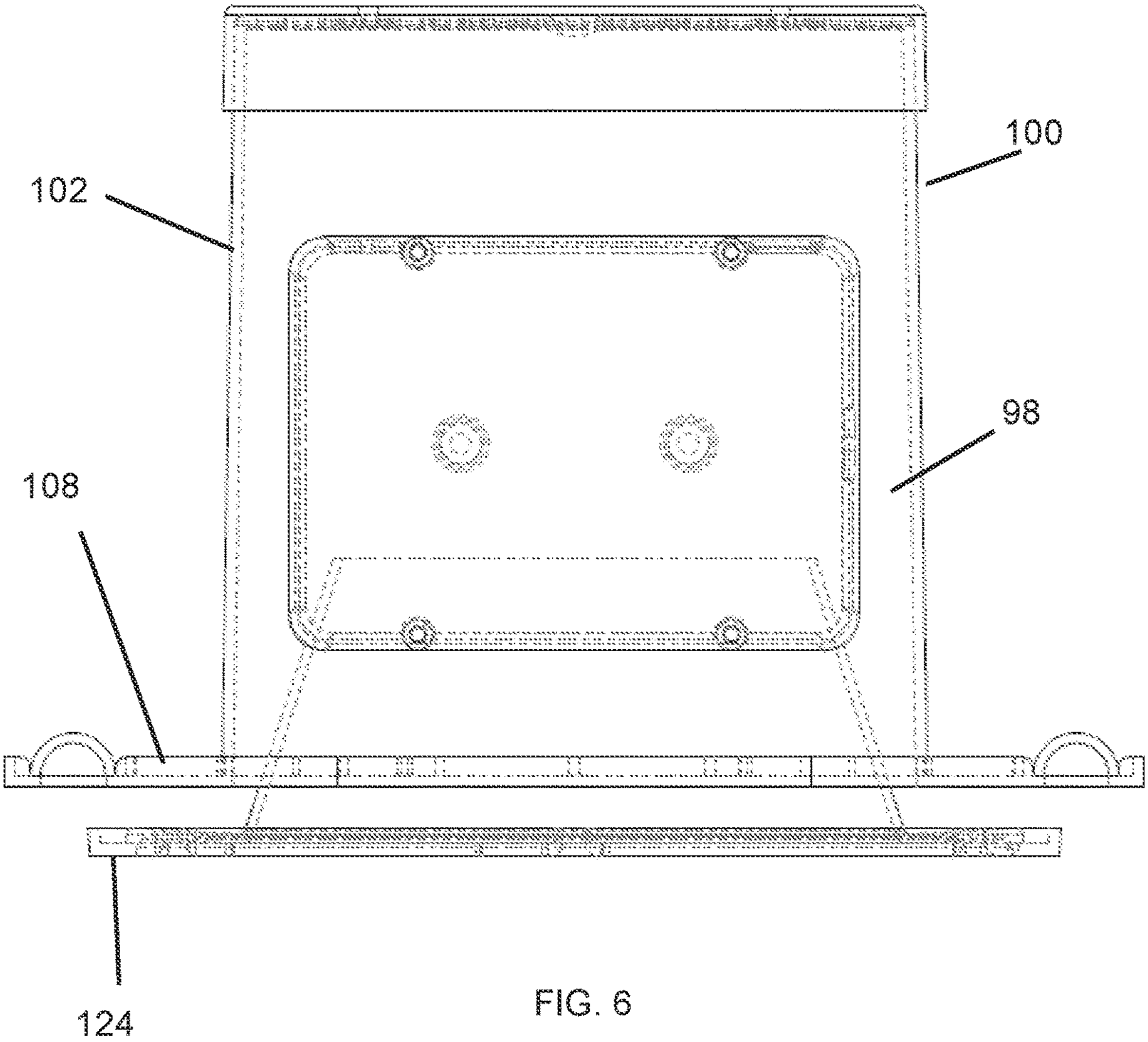
FIG. 6 is a sectional front view of a portion of one embodiment of the present invention.
Figure 7:
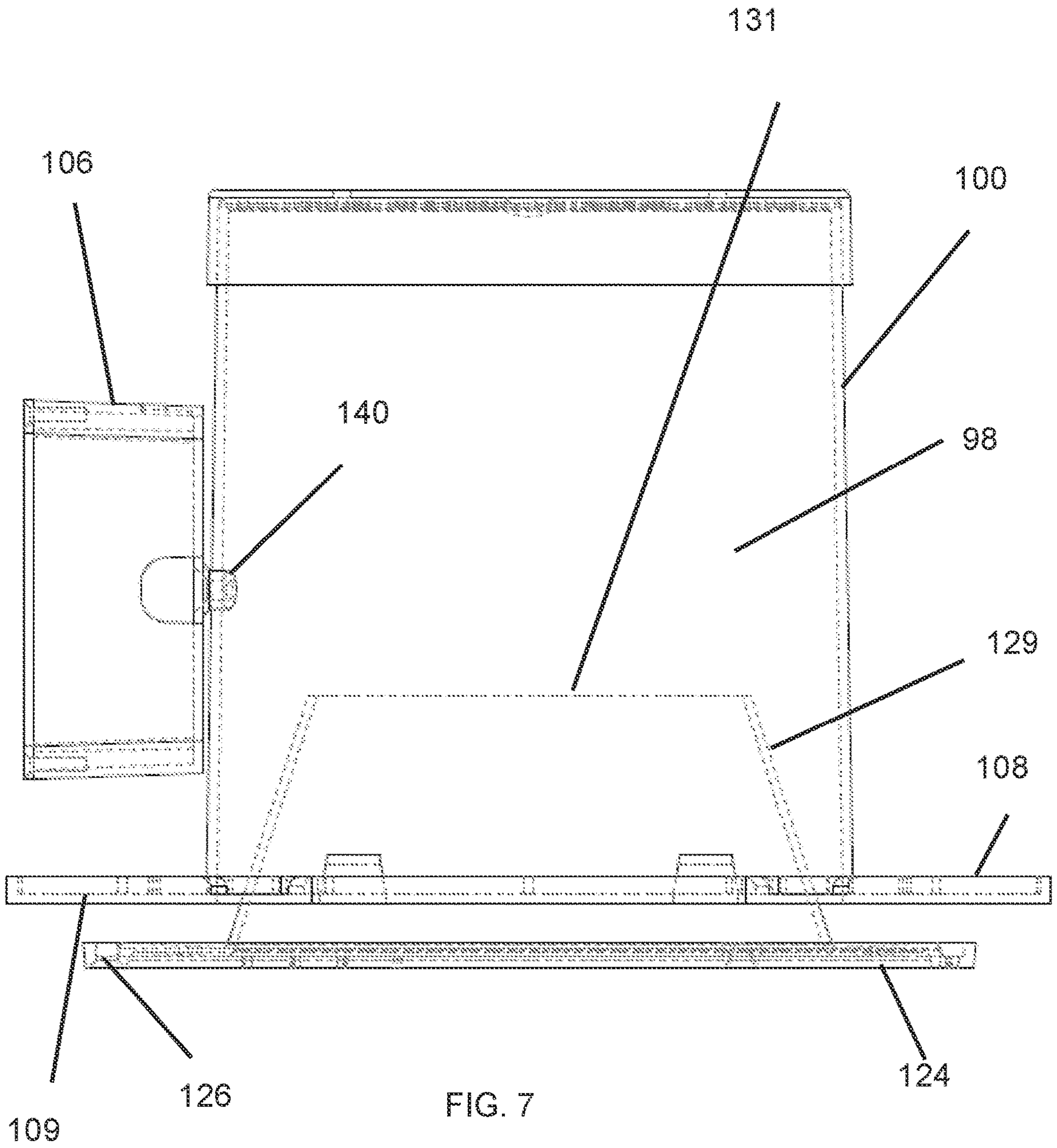
FIG. 7 is a sectional right side view thereof.

FIGS. 6 and 7 show the trim adapter 124 with the housing 102. The trim secures to the base 108 of the housing 102. The trim adapter 124 passes partially into opening 98. However, trim adapter 124 cannot pass completely through the opening 98. Neck 129 and opening 131 extend into the housing 102. The light installs vertically above neck 129 and opening 131. The user inserts the light through opening 131 and neck 129 to install the light.

The outer portion of the base of the trim adapter 124 is sized larger than opening 98. The trim adapter 124 is visible from below the ceiling. The trim adapter 124 provides a trim attachment aperture 126 for securing the trim adapter 124 to the base 108. Fasteners insert into fastener apertures 126 of trim adapter 124 into fastener apertures 109 of the base 108. The fasteners inserted into fastener apertures 126, 109 secure the trim adapter 124 to the base 108.

Trim attachment aperture 128 within the trim adapter 124 accepts a finger of the trim. The trim attachment aperture 128 enables insertion of the finger. The user then rotates the trim to secure the trim to the trim adapter 124. Rotation of the trim and the fingers within the trim attachment apertures 128 secures the trim onto the trim adapter 124. Rotation in a first direction attaches the trim to the trim adapter. Rotation in the opposite direction detaches the trim from the trim adapter.

Figure 8:
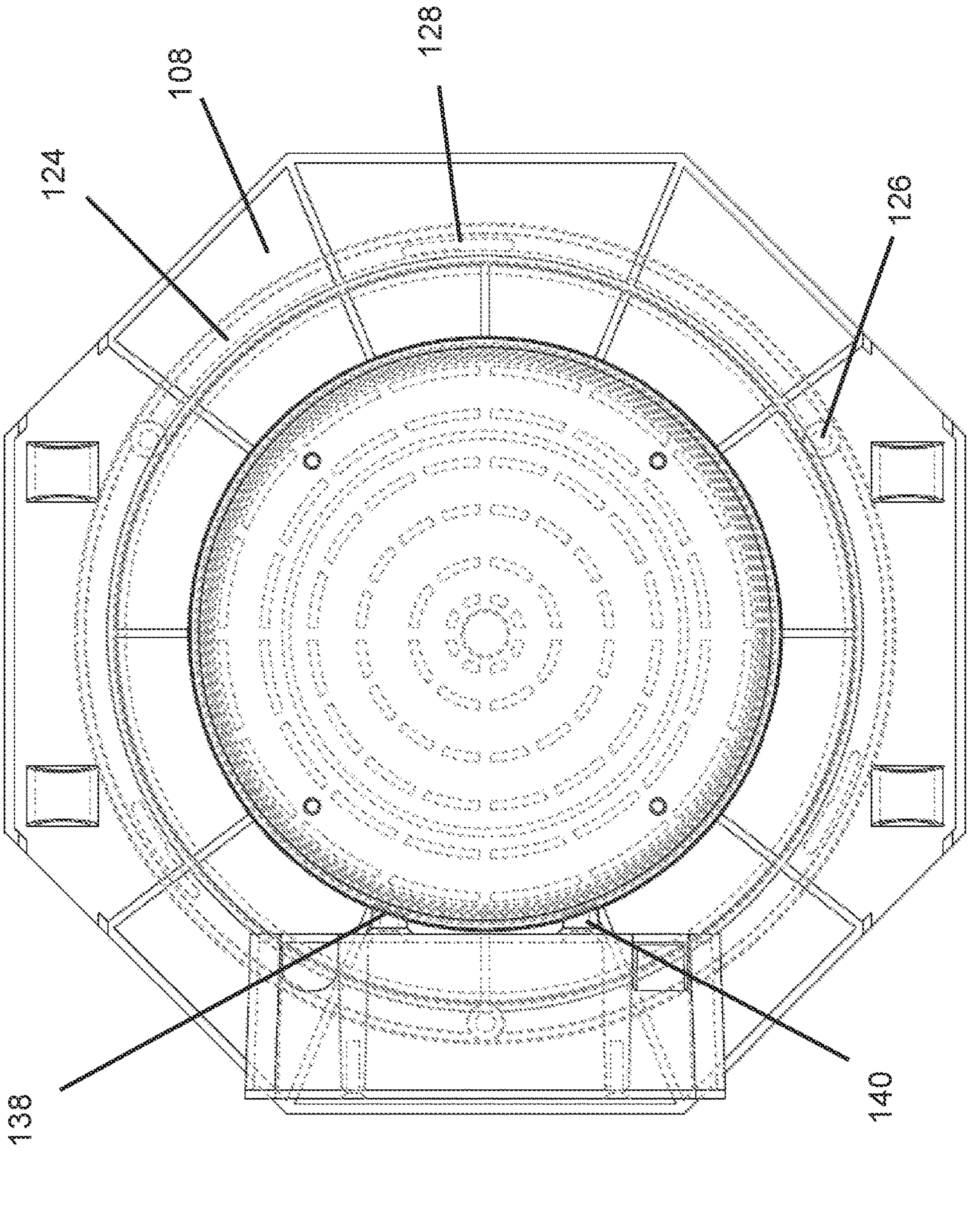
FIG. 8 is a top view thereof.

FIGS. 7 and 8 also show the attachment of the box 106 to housing 102. The box 106 houses the wiring needed for the light installed within the housing 102. Conductors 138, 140 connected to an external power source insert into corresponding openings within the housing 102 for powering the light.

Fastener apertures 137 within the box 108 accept a fastener. The fasteners inserted through the fastener apertures 137 into the housing 102 secure the box 108 to the housing 102.

Figure 9:
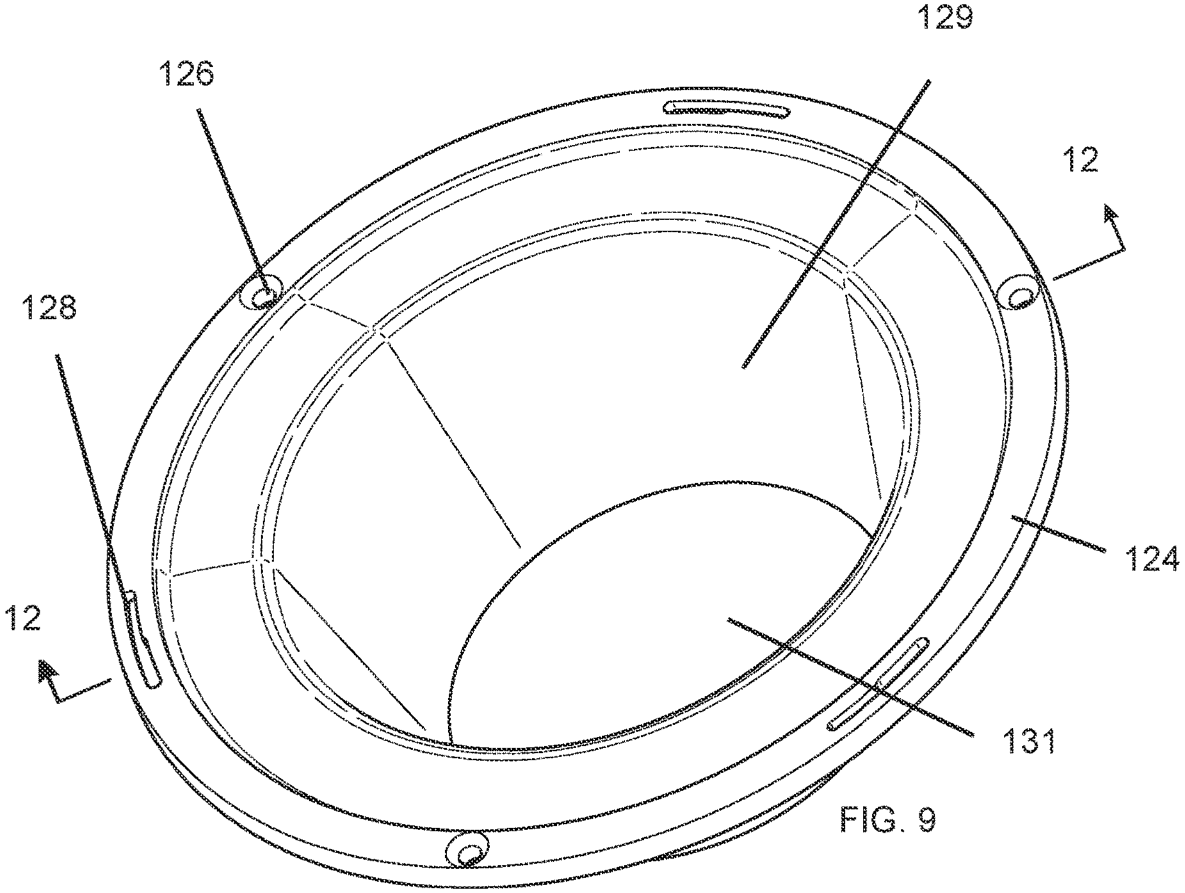
FIG. 9 is a bottom perspective view of a trim adapter of one embodiment of the present invention.
Figure 10:
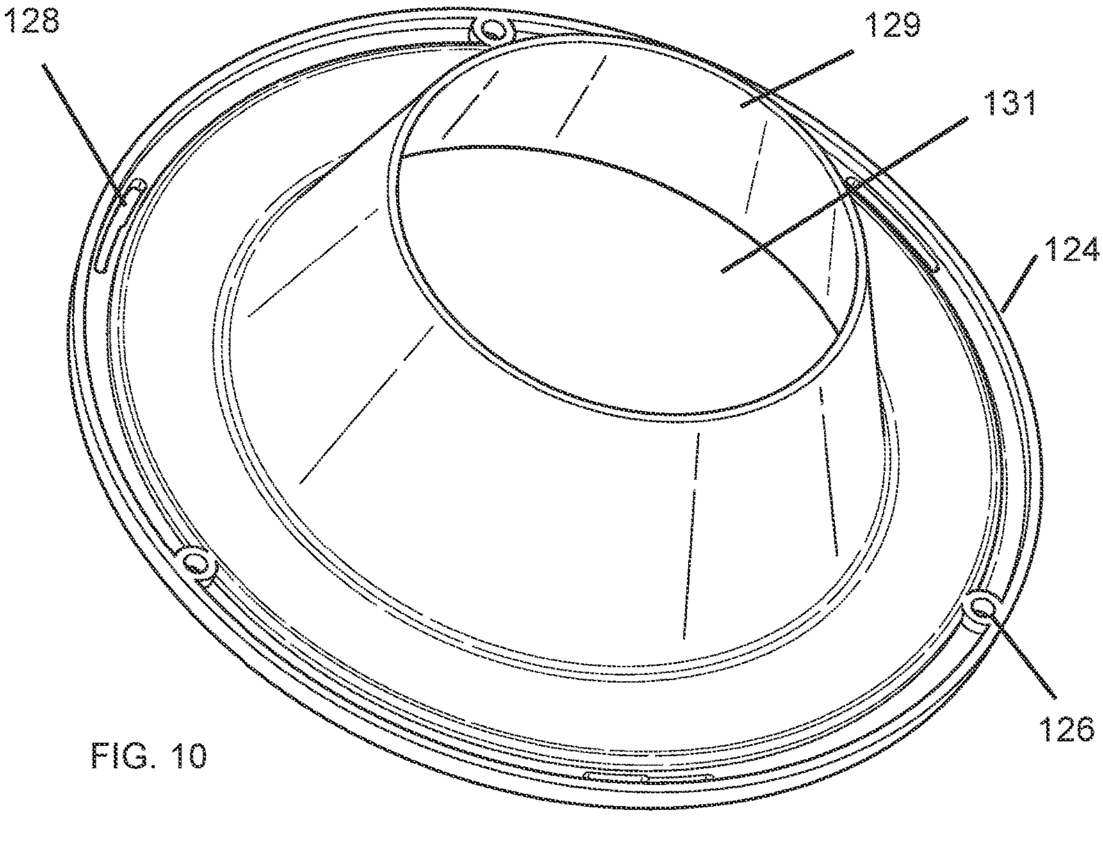
FIG. 10 is a top perspective view thereof.

FIGS. 9 and 10 show the trim adapter 124. As discussed above, the trim adapter 124 attaches to the base of the housing via fasteners installed within attachment apertures 126. The trim attaches to the trim adapter 124 at trim attachment apertures 128 via fingers on the trim.

Neck 129 provides opening 131 to allow light to pass through the system. The neck 129 extends into the housing to direct the light downwards. The light shines through opening 98.

Figure 11:
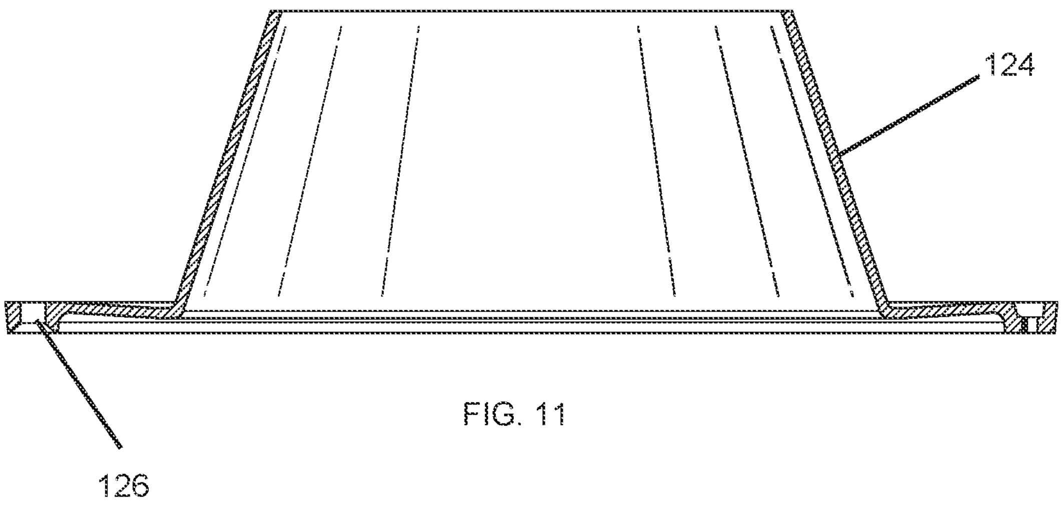
FIG. 11 is a sectional view thereof.
Figure 12:
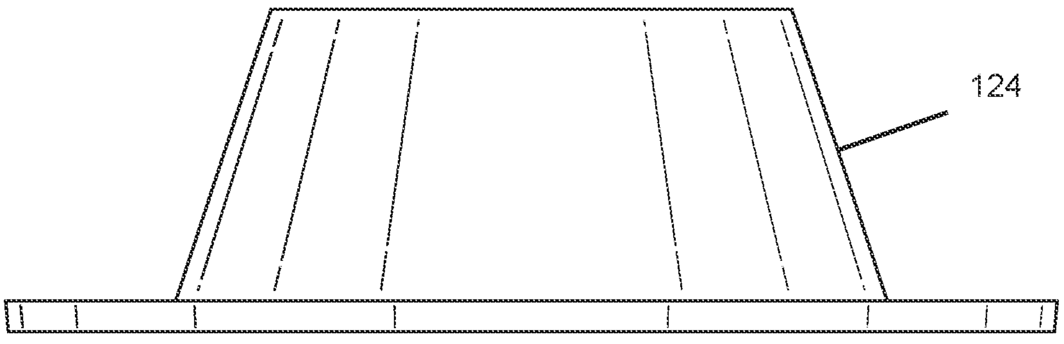
FIG. 12 is a front view thereof.

FIGS. 11 and 12 provide additional views of the trim adapter 124. Fasteners insert into fastener apertures 126 to secure the trim adapter 124 to the base of the housing.

Figure 13:
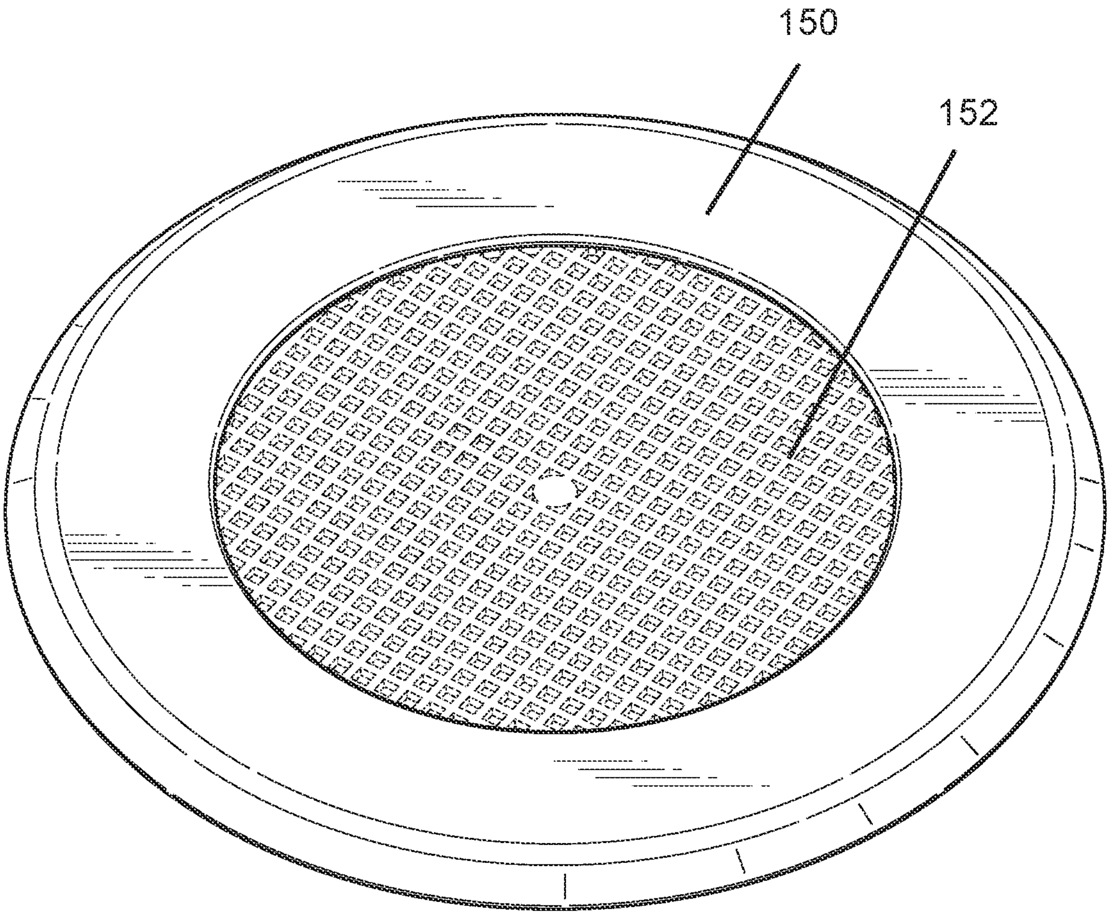
FIG. 13 is a bottom environment view of a trim of one embodiment of the present invention.
Figure 14:
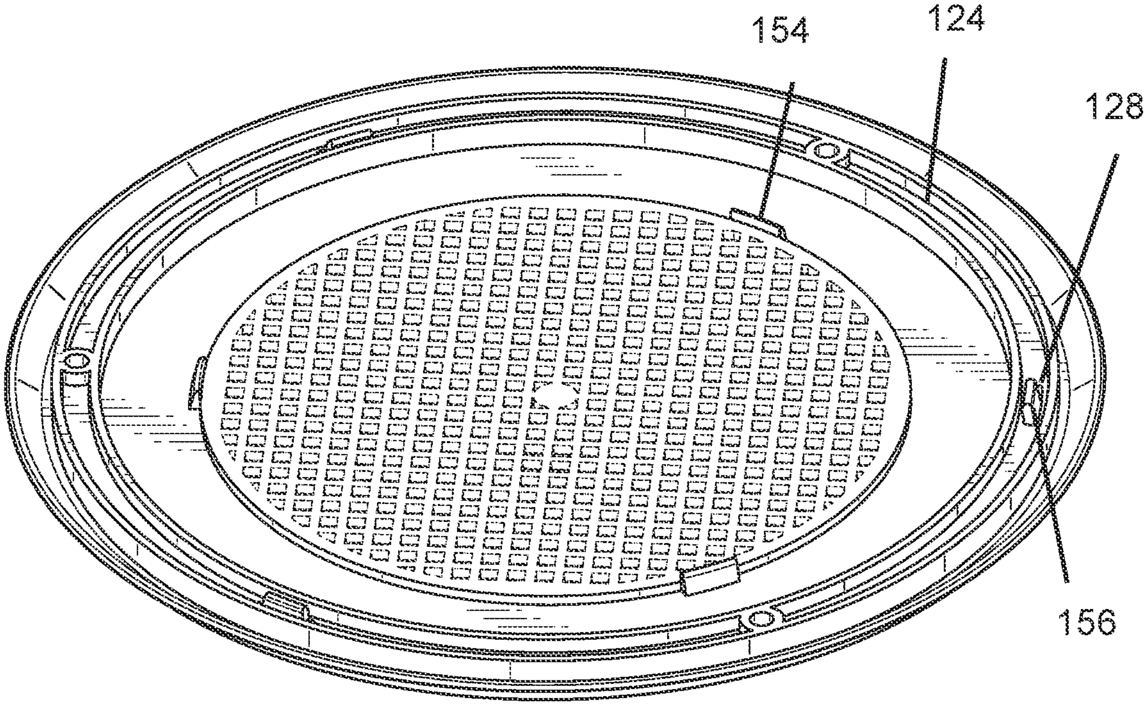
FIG. 14 is a top environmental view thereof.
Figure 15:
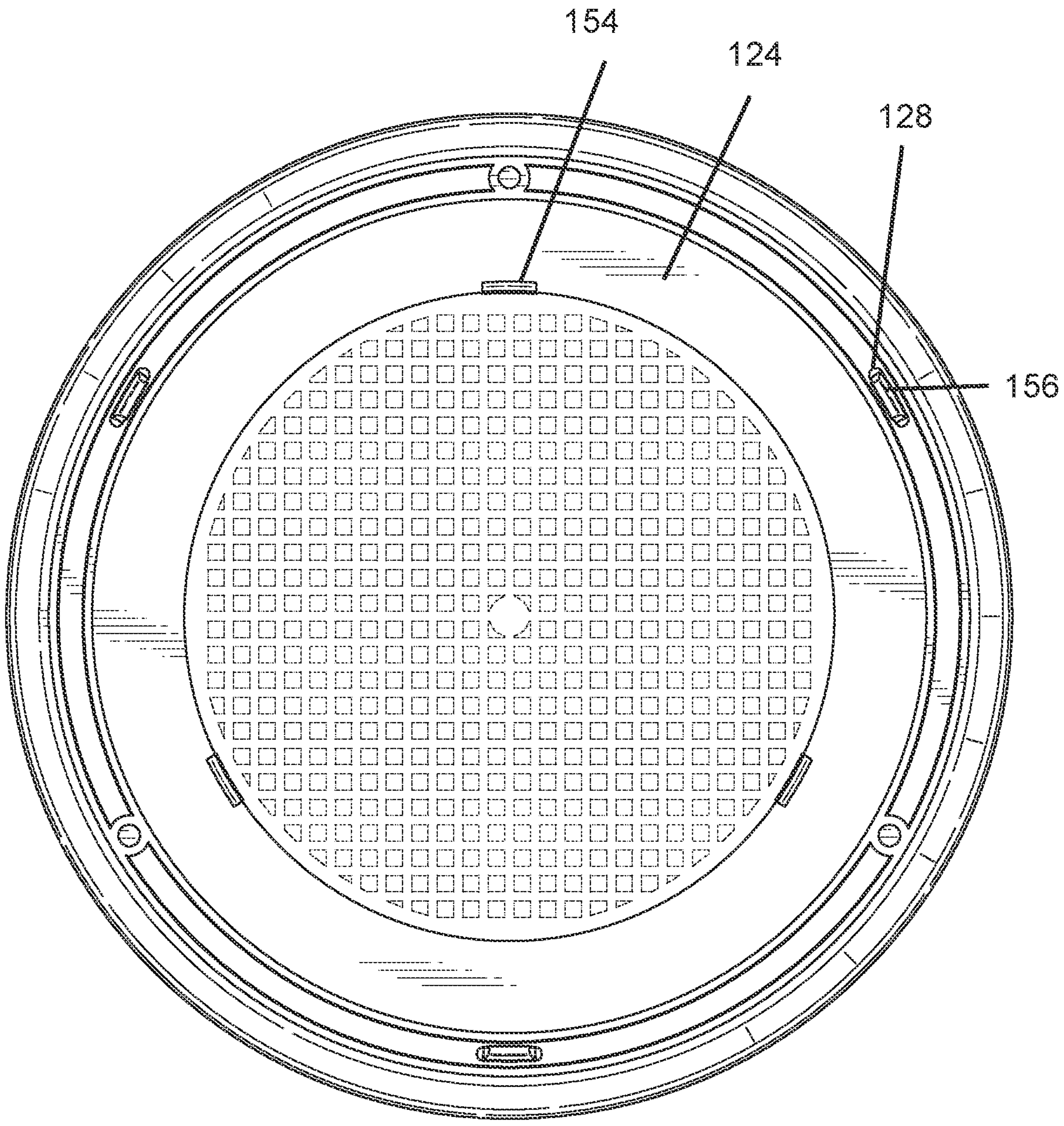
FIG. 15 is a top view thereof.

FIGS. 13-15 show a partial view of the trim 150 and insert 152, such as a lens or plate, installed on the trim adapter 124. The neck has been removed in FIG. 15 to provide details concerning the attachment of the trim 150 with the trim adapter 124. The insert 152 inserts into the trim 150 to secure the insert with the housing and the lighting. The user can also remove the insert 152 for operating and/or changing the light. Attachment arms 154 secure the insert 152 to the trim 150.

Trim fingers 156 extend upward into the trim attachment apertures 128. The user rotates the trim 150 to secure the trim 150 to the trim adapter 124. Rotating the trim 150 adjusts the trim fingers 156 within the trim attachment apertures 128 to secure the trim 150. As discussed above, rotating in the opposite direction removes the trim 150 from the trim adapter 124.

Figure 16:
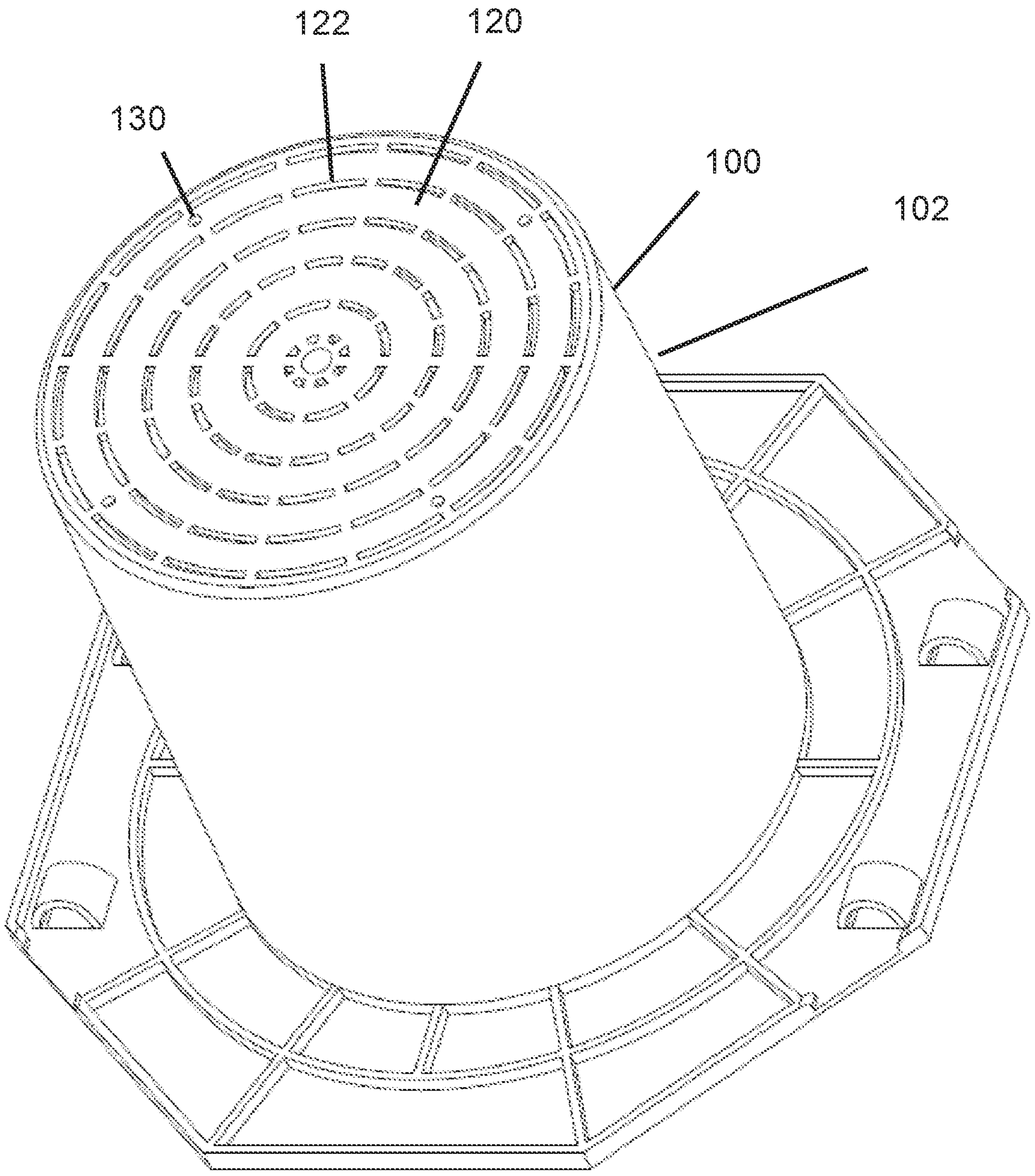
FIG. 16 is a top perspective view of a housing of one embodiment of the present invention.
Figure 18:
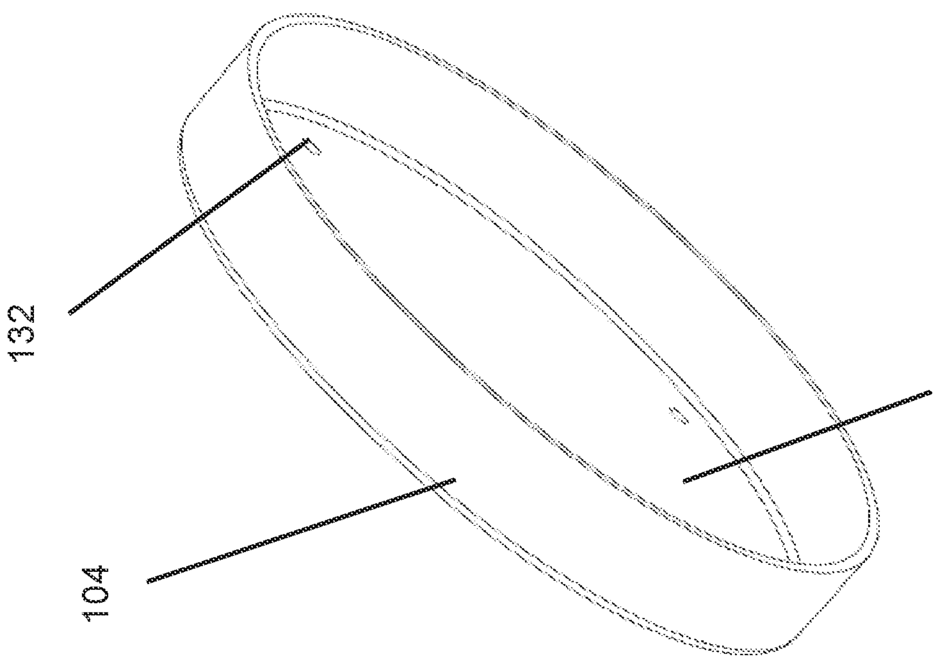
FIG. 18 is a bottom perspective thereof.
Figure 17:
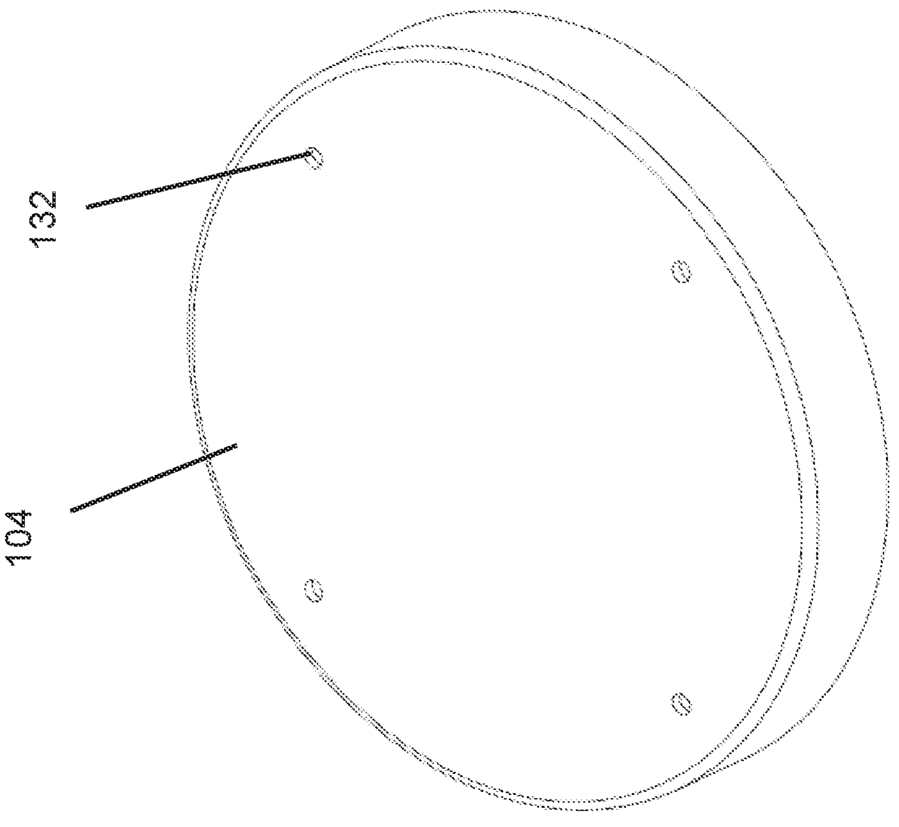
FIG. 17 is a top perspective view of a top cover of one embodiment of the present invention.
Figure 20:
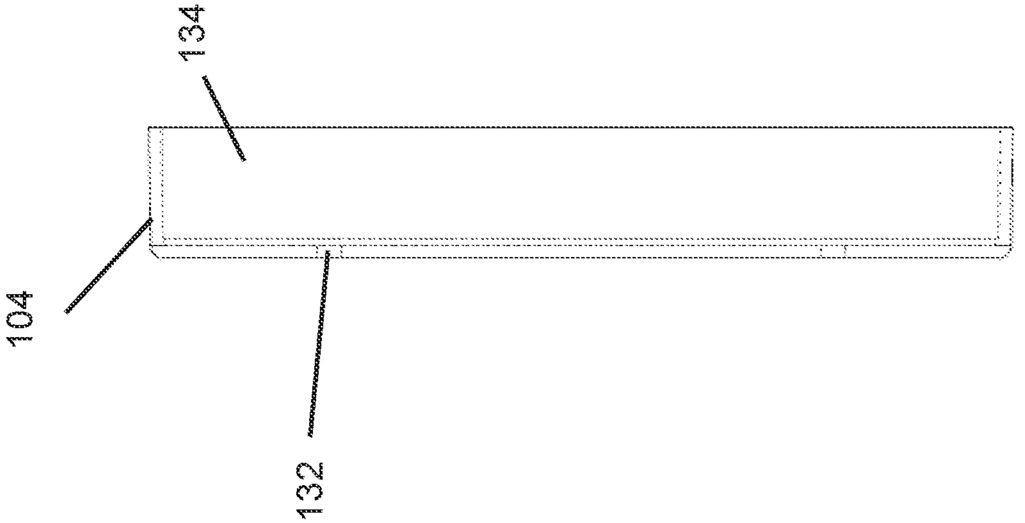
FIG. 20 is a sectional view thereof.
Figure 19:
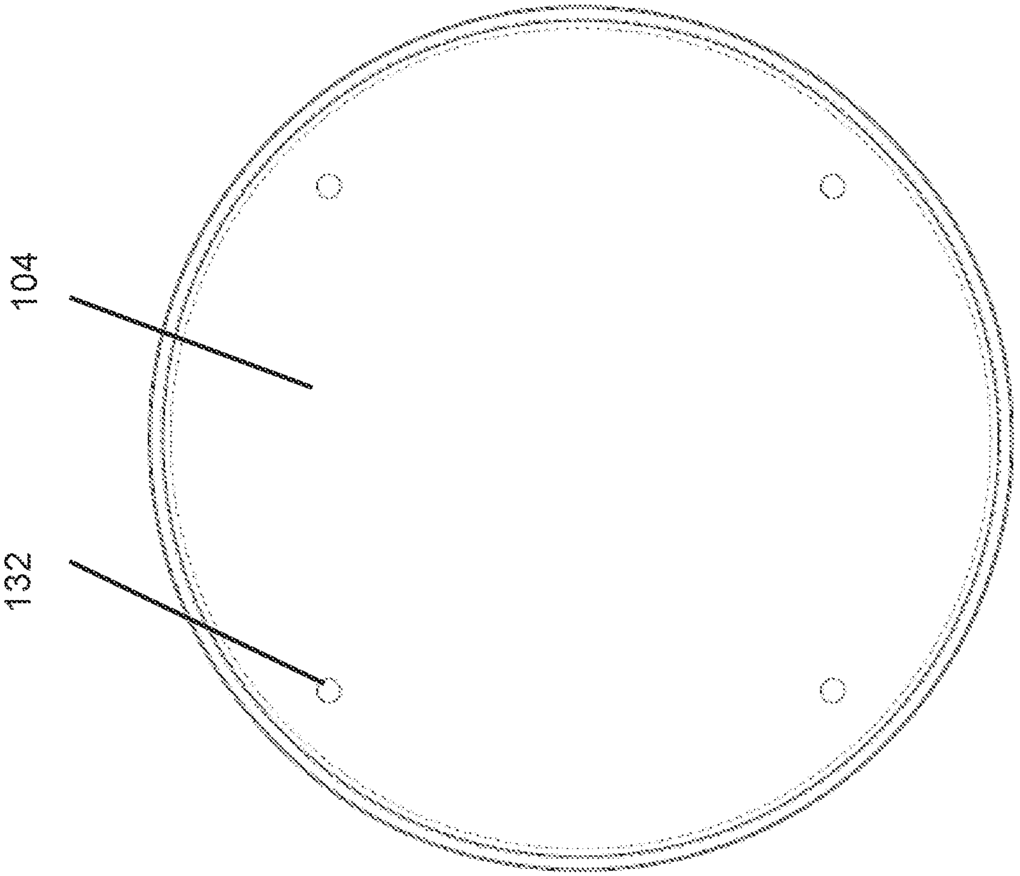
FIG. 19 is a bottom view thereof.
Figure 21:
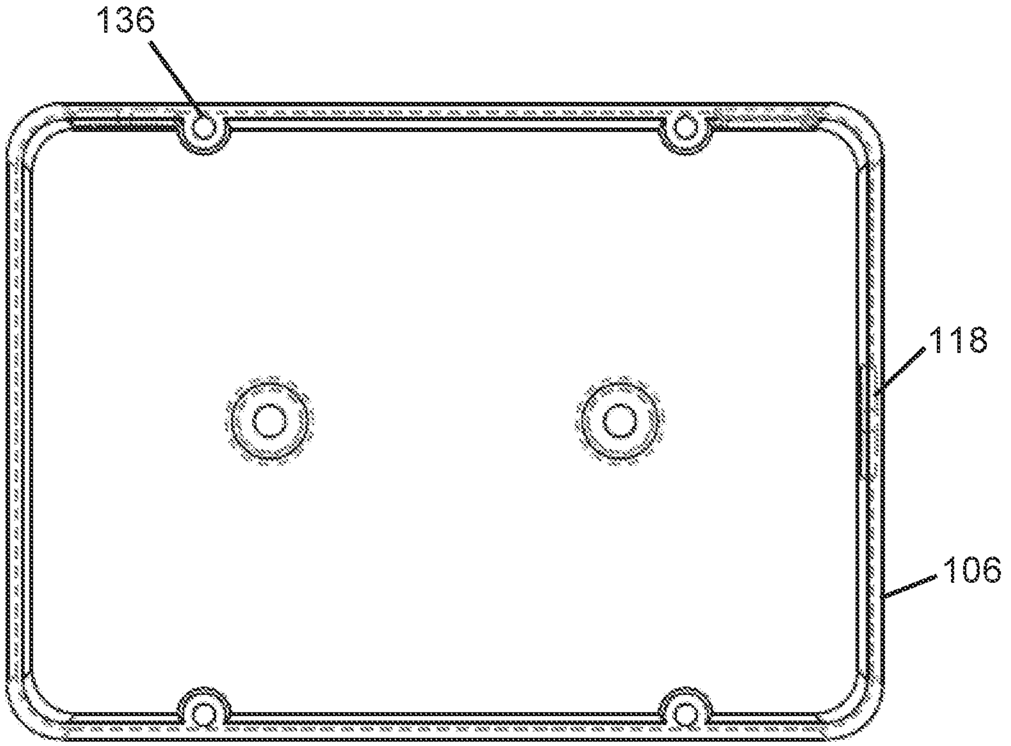
FIG. 21 is a front view of a box of one embodiment of the present invention.
Figure 22:
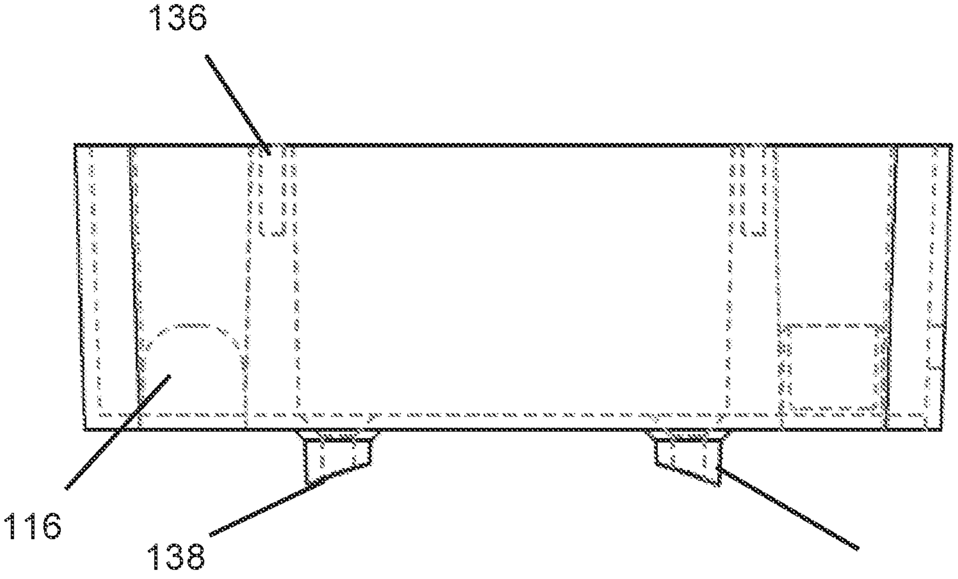
FIG. 22 is a sectional view thereof.
Figure 23:
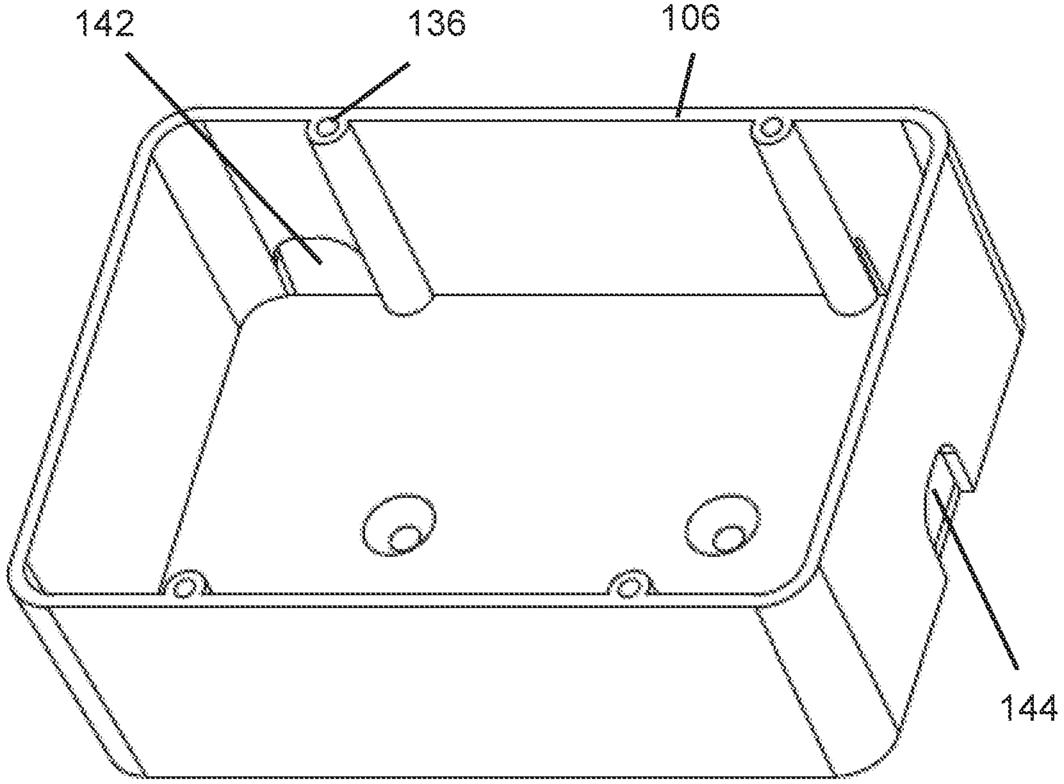
FIG. 23 is a front perspective view.
Figure 24:
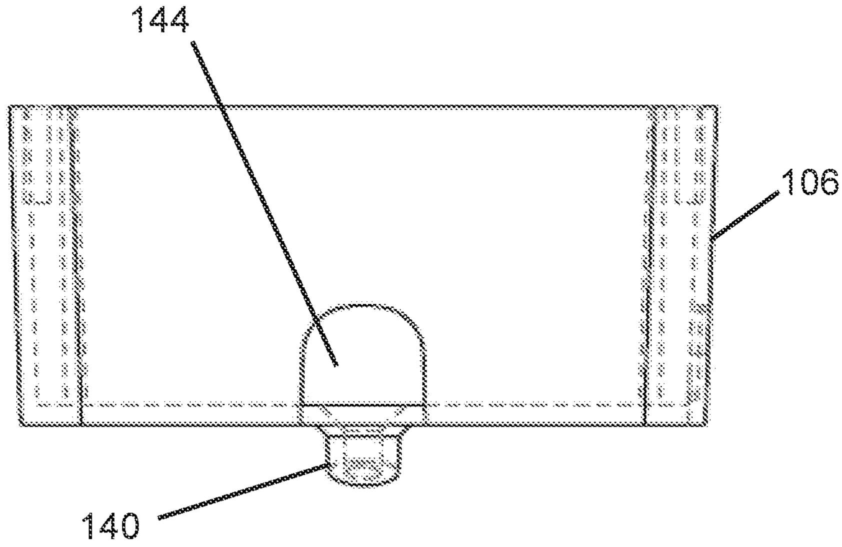
FIG. 24 is a sectional view thereof.
Figure 26:
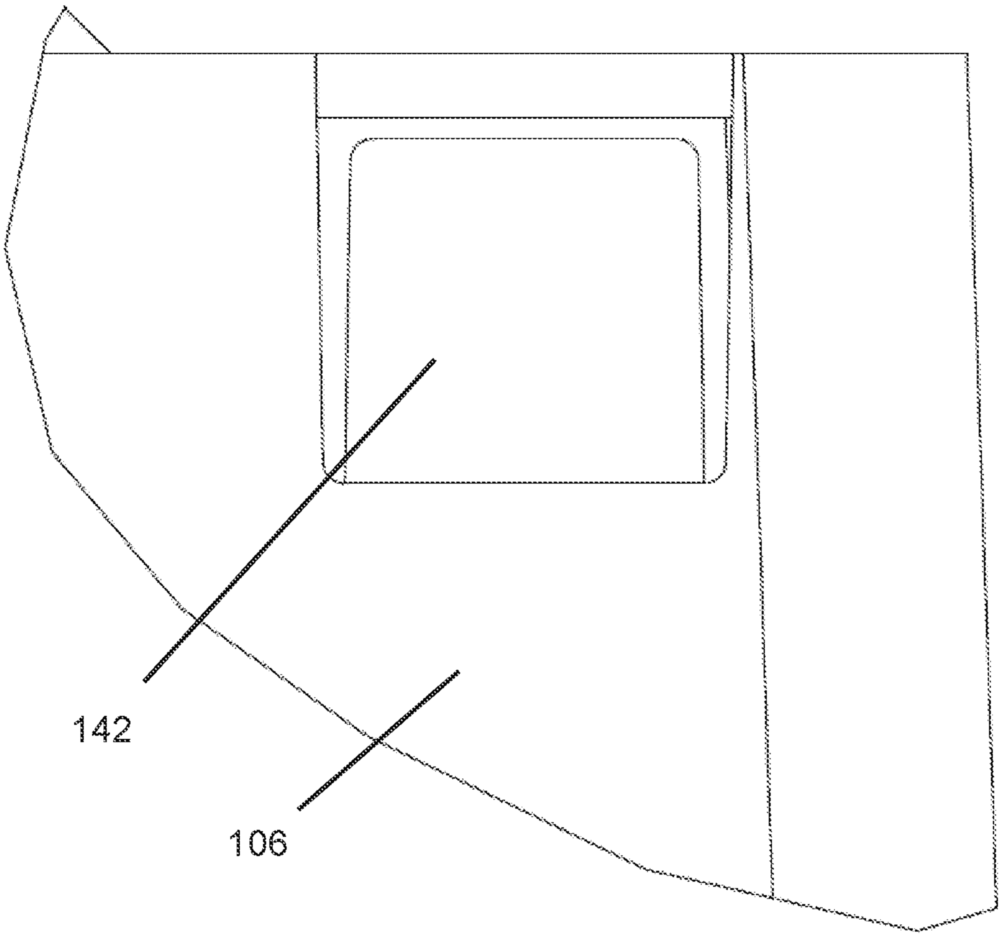
FIG. 26 is a sectional view thereof.
Figure 25:
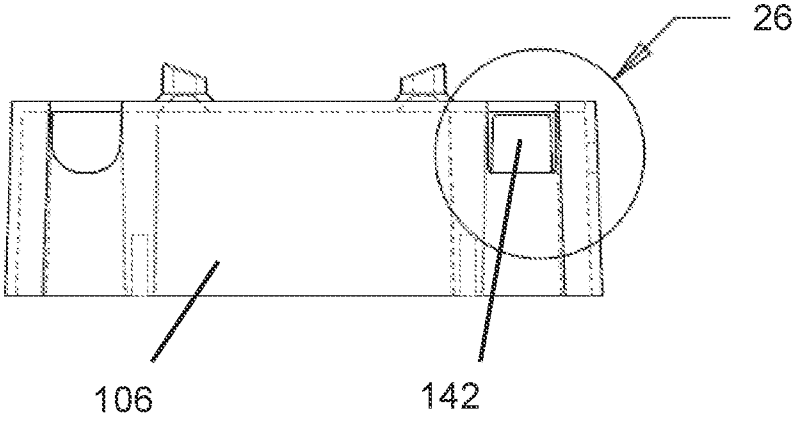
FIG. 25 is a top sectional view thereof.
Figure 28:
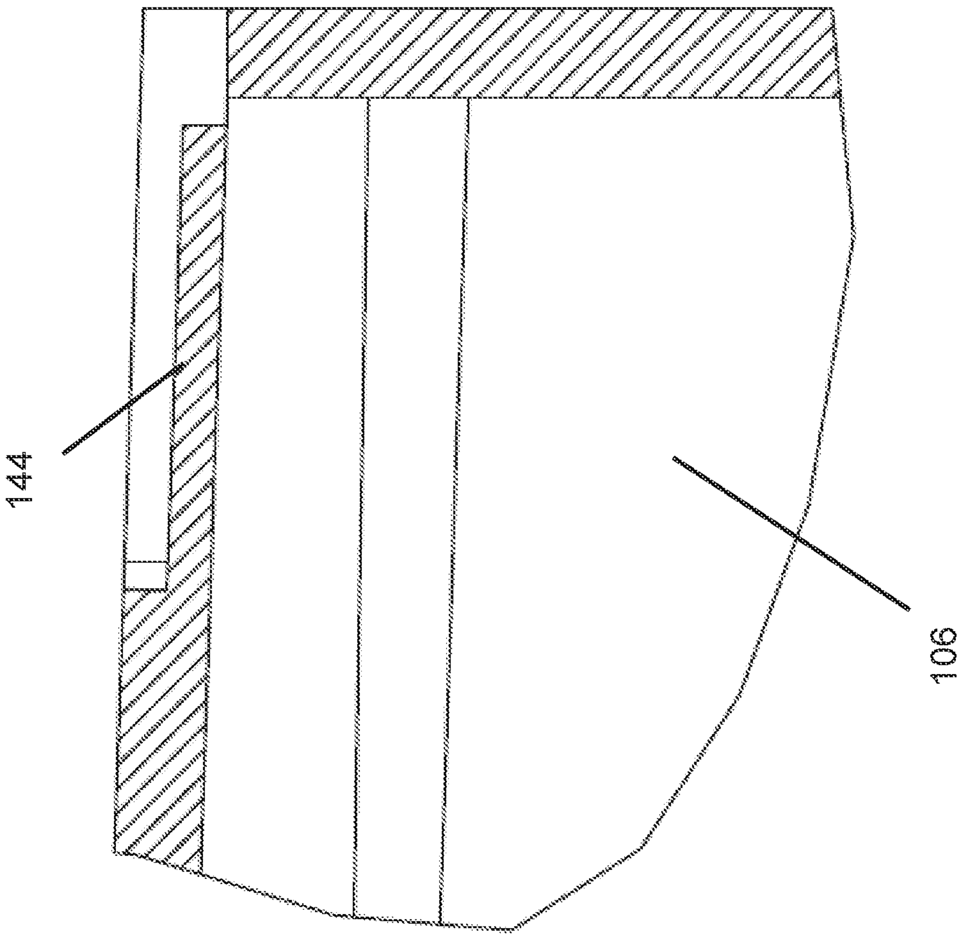
FIG. 28 is a sectional view thereof.
Figure 27:
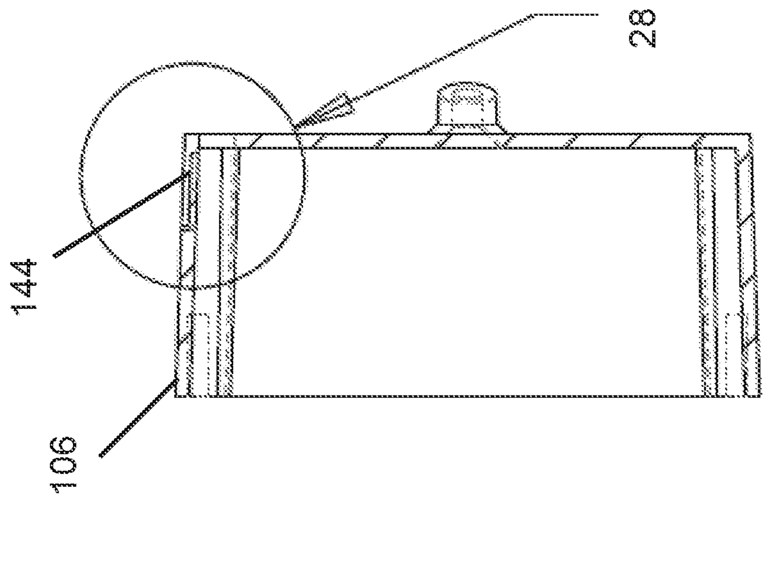
FIG. 27 is a right side sectional view thereof.

FIG. 16 shows the housing 102 of the system 100 with the top cover removed. Removing the top cover exposes the upper surface 120 of the housing 102. The housing 102 provides vents 122 in the upper surface 120. The vents 122 ventilate the housing 102 and the light. The user may remove the top cover when ventilation is needed. The user may also remove the top cover when birds, insects, or other pests will not be entering the housing 102 to build nests.

Fastener apertures 130 within the upper surface 120 accept a fastener to secure the top cover to the housing. The top cover attaches to the housing to create a self-contained can lighting. The top cover reduces the number of birds, insects, or other pests building nests and/or living within the housing 102.

FIGS. 17-20 show the top cover 104 that installs on the housing. The top cover 104 limits birds, insects, or other pests from entering the housing. Top cover 104 limits access within the upper surface 120 of the housing 102. Top cover 104 blocks access through the vents 122. Fastener apertures 132 accept a fastener to secure the top cover 104 to the housing.

FIGS. 21-24 show the box 106. Box 106 stores the wiring for the lighting system. Fastening apertures 136 accept a fastener for securing the box 106 to the housing. Conductors 138, 140 show the wiring that exits the box 106 and enters the housing 102 to power the light. Box 106 of one embodiment serves as a junction box that stores the wiring for powering the light. The box 106 attaches to the housing to provide self-contained wiring for the lighting system.

The user connects the box 106 with a power source to power the light. The user wires the box 106 with an external power source. The box 106 provides punch tabs 142, 144 that form openings into the box 106. The user breaks open the tabs 142, 144 needed to wire the box 106. The user connects the power source through an opening or openings formed by breaking open tabs 142, 144. Conductors 138, 140 power the light. The conductors 138, 140 connect to the housing to power the lights.

The user breaks the tabs and installs power to the box 106. The powered box 106 then powers the light.

Figure 29:
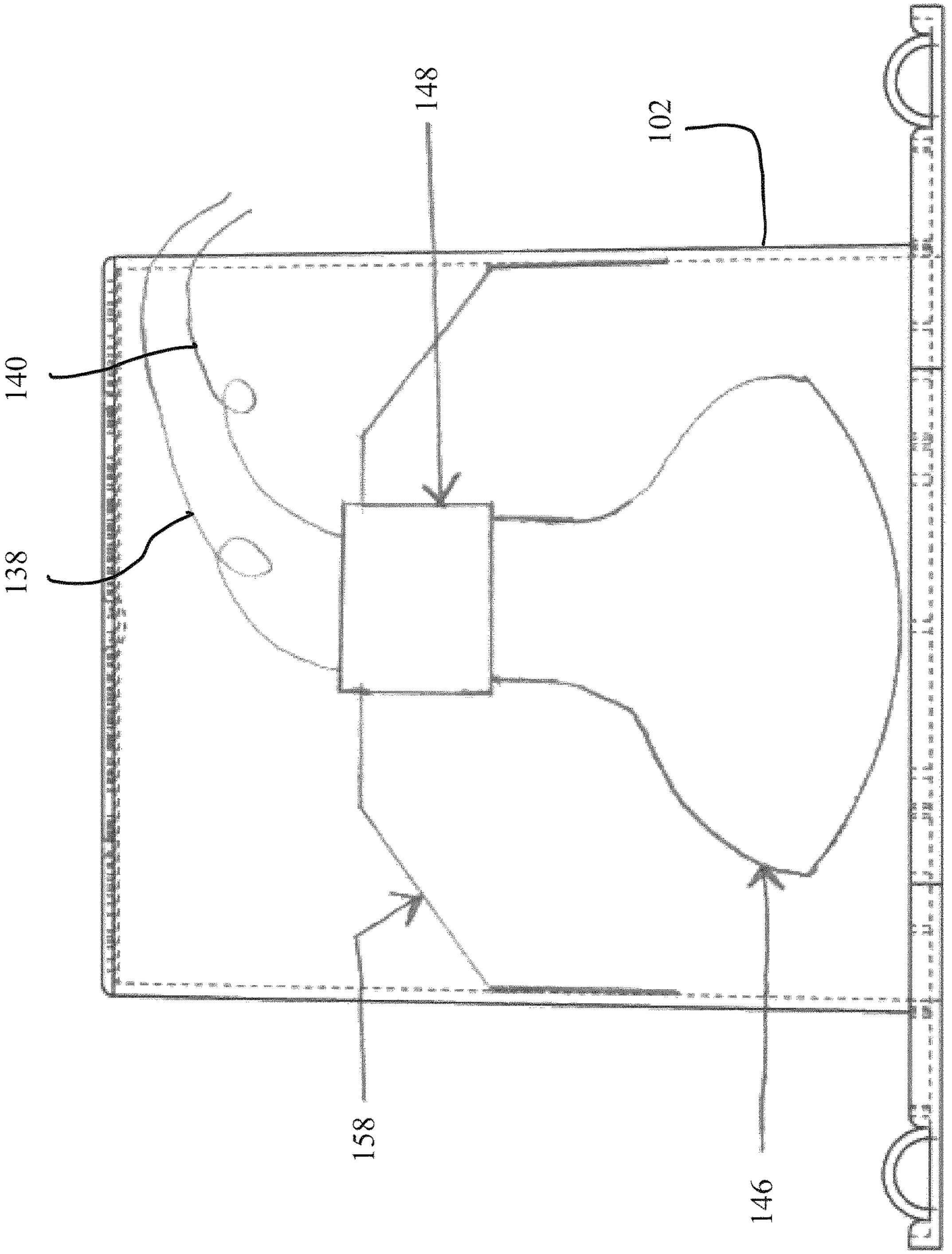
FIG. 29 is a sectional view thereof.

FIG. 29 shows a sectional view of the housing 102. The lighting system secures the light bulb and provides an opening in the housing for conductors 138, 140. Conductors 138, 140 install through the opening in the housing 102 at which box 106 secures to the housing 102.

The recessed lighting system enables quick installation of recessed lighting with venting. Light bulb 146 installs into socket 148. Wiring, such as conductors 138, 140 connects to a power source (not shown) that powers the light bulb 146. Conductors 138, 140 install through the opening into the interior of the housing.

A mounting bracket 158 secures to the interior of the housing 102. The mounting bracket 158 secures the socket 148 and the light bulb 146 to the housing 102. The light bulb 146 installs into the socket 148 to provide lighting.

The mounting bracket 158 secures to the housing 102. The mounting bracket 158 of one embodiment attaches to the housing 102 in a fixed position. The mounting bracket 158 of one embodiment adjustably attaches to the housing 102 to change the height of the socket 148 and the bulb 146 within the housing 102. In one embodiment, the mounting bracket 158 attaches to the housing 102 via fasteners, including but not limited to rivets, pop rivets, nuts and bolts, bolts and wingnuts, screws, and other fasteners. Another embodiment may provide an attachment lip on the interior of the housing 102 in which the bracket 158 inserts. Adhesives may also secure the mounting bracket 158 to the housing 102.

Although the present invention has been described and illustrated with respect to a preferred embodiment and a preferred use therefor, it is not to be so limited since modifications and changes can be made therein which are within the full intended scope of the invention.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A recessed lighting system that connects to wiring that provides power to a light for lighting an area, the system comprising: a housing for placement of the light; an opening in the housing that extends vertically down from the housing wherein the opening allows the light to shine vertically down; a base of the housing forming a bottom surface of the housing; a neck of the housing wherein the neck extends vertically upward from the base, wherein the neck defines an outer portion of the opening; a top of the housing located vertically above the neck, wherein the top forms an upper surface of the housing, wherein the top covers a majority of the opening; a vent within the top of the housing, wherein the vent extends through the upper surface into the opening within the housing; wherein the top and the neck form a unitary piece from a single component; a top cover that secures to the top of the housing, wherein removing the top cover opens the vent, wherein attaching the top cover closes the vent.

2. The system of claim 1, wherein the top cover covers the vent limiting access through the vent.

3. The system of claim 1 further comprising:

a fastener aperture within the top cover;

a fastener aperture within the top of the housing, wherein a fastener inserted into the fastener aperture within the top cover and the fastener aperture within the top of the housing secures the top cover to the housing.

4. The system of claim 1 further comprising:

an attachment arm secured to the base wherein the attachment arm forms an aperture above the base;

a lip positioned along an outer edge of the base, wherein the lip extends vertically above the base;

a mouth aligned with the attachment arm wherein the mouth forms a flattened edge of the base to form an opening in the lip, wherein the mouth is located vertically below the lip.

5. The system of claim 1 further comprising:

a junction box that attaches to the housing, wherein the box stores the wiring to power the light;

an aperture in the neck, wherein the junction box attaches to the neck at the aperture for the wiring from the junction box to enter the housing laterally through the neck.

6. The system of claim 1, wherein the vent terminates prior to reaching the neck.

7. The system of claim 1, wherein the neck and the top of the housing form a cylinder, wherein the cylinder is partially closed having a first end located at the base and a second end located at the upper surface, wherein the second end is partially closed, wherein the opening extends vertically through less than half of the second end;

wherein at least half of the second end is closed, wherein the second end is configured for installation and operation within an attic space;

wherein the housing is configured for operation with the upper surface and the vent exposed for circulation of air through the second end and the attic space.

8. A recessed lighting system that connects to wiring that provides power to a light for lighting an area, the system comprising: a housing for placement of the light; an opening in the housing that extends vertically down from the housing wherein the opening allows the light to shine vertically down; a base of the housing forming a bottom surface of the housing; a neck of the housing wherein the neck extends vertically upward from the base, wherein the neck defines an outer portion of the opening; a top of the housing located vertically above the neck, wherein the top forms an upper surface of the housing, wherein the top of the housing defines an upper portion of the opening; a vent within the top of the housing, wherein the vent extends through the upper surface into the opening within the housing; wherein the upper surface of the housing covers a majority of the opening above the neck, wherein the opening extends vertically through less than half of the upper surface of the housing; wherein the top, the upper surface, and the neck form a unitary piece from a single component; a top cover that secures to the top of the housing, wherein removing the top cover opens the vent, wherein attaching the top cover closes the vent.

9. The system of claim 8, wherein the top cover covers the vent, the top cover limiting access into the opening through the vent.

10. The system of claim 8 further comprising:

a lip positioned along an outer edge of the base, wherein the lip extends vertically above the base;

an attachment arm secured to the base, wherein the attachment arm extends vertically above the lip;

an aperture formed vertically between the attachment arm and the base, the aperture extending vertically above the lip;

a mouth aligned with the attachment arm wherein the mouth forms a flattened edge of the base to form an opening in the lip, wherein the mouth is located at an edge of the base, wherein the mouth is located vertically below the lip.

11. The system of claim 8 further comprising:

a junction box that attaches to the housing, wherein the junction box stores the wiring to power the light;

an aperture in the neck, wherein the junction box attaches to the neck at the aperture for the wiring from the junction box to enter the housing.

12. The system of claim 11 further comprising:

a first breakout tab of the junction box wherein the first breakout tab detaches from the box;

a second breakout tab of the junction box wherein the second breakout tab detaches from the box;

a first wall of the junction box wherein the first breakout tab opens a portion of the first wall; and a second wall of the junction box wherein the second breakout tab opens a portion of the second wall, wherein the first wall and the second wall are located adjacent each other.

13. The system of claim 8, wherein the neck and the top of the housing form a cylinder, wherein the cylinder is partially closed having a first end located at the base and a second end located at the upper surface, wherein the second end is partially closed, wherein the opening extends vertically through less than half of the second end;

wherein at least half of the second end is closed;

wherein the housing is configured for operation with the upper surface and the vent exposed for circulation of air through the second end.

14. The system of claim 13, wherein the vent terminates prior to reaching the neck.

15. A recessed lighting system that connects to wiring that provides power to a light for lighting an area, wherein the system allows circulation of air through an attic space, the system comprising: a housing for placement of the light; an opening in the housing that extends vertically down from the housing wherein the opening allows the light to shine vertically down; a base of the housing forming a bottom surface of the housing; a neck of the housing wherein the neck extends vertically upward from the base, wherein the neck defines an outer portion of the opening; a top of the housing located vertically above the neck, wherein the top forms an upper surface of the housing, wherein the top of the housing defines an upper portion of the opening; wherein the housing, the base, the neck, the upper surface, and the top form a unitary piece; vents within the top of the housing, wherein the vents extend through the upper surface into the opening within the housing, wherein the vents terminate prior to reaching the neck; wherein the upper surface of the housing covers a majority of the opening above the neck, wherein the opening extends vertically through less than half of the upper surface of the housing; wherein the housing is configured for operation with the upper surface and the vents exposed for circulation of air through the housing and the attic space; a top cover that secures to the top of the housing, wherein removing the top cover opens the vents, wherein attaching the top cover closes the vents.

16. The system of claim 15, wherein the neck and the top of the housing forms a partially closed cylinder having a first end located at the base and a second end located at the upper surface, wherein the second end is partially closed, wherein the vents extend through the second end;

wherein at least half of the second end is closed.

17. The system of claim 15 further comprising:

a mounting bracket secured to an interior of the housing, wherein the mounting bracket secures a socket within the housing in a fixed position.

* * * * *